US012670046B2

(12) United States Patent
Chawla et al.

(10) Patent No.: US 12,670,046 B2
(45) Date of Patent: Jun. 30, 2026

(54) CORRELATING SESSION FAILURES WITH APPLICATION FAULTS FROM APPLICATION UPGRADES

(71) Applicant: Citrix Systems, Inc., Fort Lauderdale, FL (US)

(72) Inventors: Prabhjeet Singh Chawla, Bengaluru (IN); Vindhya Gajanan, Bengaluru (IN)

( * ) Notice: Subject to any disclaimer, the term of this patent is extended or adjusted under 35 U.S.C. 154(b) by 246 days.

(21) Appl. No.: 17/948,502

(22) Filed: Sep. 20, 2022

(65) Prior Publication Data

US 2024/0095111 A1    Mar. 21, 2024

(51) Int. Cl.
| | |
|---|---|
| *G06F 11/00* | (2006.01) |
| *G06F 8/65* | (2018.01) |
| *G06F 8/71* | (2018.01) |
| *G06F 8/77* | (2018.01) |
| *G06F 11/34* | (2006.01) |

(52) U.S. Cl.
CPC .............. *G06F 11/006* (2013.01); *G06F 8/65* (2013.01); *G06F 8/71* (2013.01); *G06F 8/77* (2013.01); *G06F 11/3409* (2013.01); *G06F 2201/865* (2013.01)

(58) Field of Classification Search
CPC .... G06F 11/006; G06F 11/34; G06F 11/3409; G06F 8/65; G06F 8/71; G06F 8/77
See application file for complete search history.

(56) References Cited

U.S. PATENT DOCUMENTS

| | | | | |
|---|---|---|---|---|
| 9,058,251 | B1 * | 6/2015 | Dorwin ................ | G06F 11/302 |
| 12,287,728 | B1 * | 4/2025 | Spencer-Harper .......................... | |
| | | | | G06F 11/3684 |
| 2011/0289499 | A1 * | 11/2011 | Haubold ................... | G06F 8/65 |
| | | | | 717/173 |
| 2014/0379901 | A1 | 12/2014 | Tseitlin et al. | |
| 2015/0143345 | A1 * | 5/2015 | Patton .................... | G06F 11/34 |
| | | | | 717/131 |
| 2015/0154077 | A1 * | 6/2015 | Marra ..................... | H04L 69/40 |
| | | | | 714/15 |
| 2015/0160944 | A1 * | 6/2015 | Bank ........................ | G06F 8/77 |
| | | | | 717/101 |
| 2019/0317754 | A1 | 10/2019 | Mosquera et al. | |
| 2021/0124672 | A1 * | 4/2021 | Abdelhalim .......... | G06F 11/327 |

OTHER PUBLICATIONS

European Extended Search Report on EP Appl. No. 23196887.6 dated Mar. 15, 2024.

* cited by examiner

*Primary Examiner* — Kamini B Patel

(57)                  ABSTRACT

Described herein are systems and methods for determining an upgrade to an application as a cause of a failure in a session. A device may detect a failure in a session via which a client is accessing a first version of an application. The device may identify, in response to detecting the failure, first performance metrics for the first version of the application and second performance metrics for a second version of the application. The device may determine, based at least on the failure, the first performance metrics, and the second performance metrics, that an upgrade to the application to the first version from the second version is a cause of the failure in the session. The device may store an association between the first version of the application and the determination that the upgrade is the cause of the failure in the session.

18 Claims, 15 Drawing Sheets

Figure 7B:
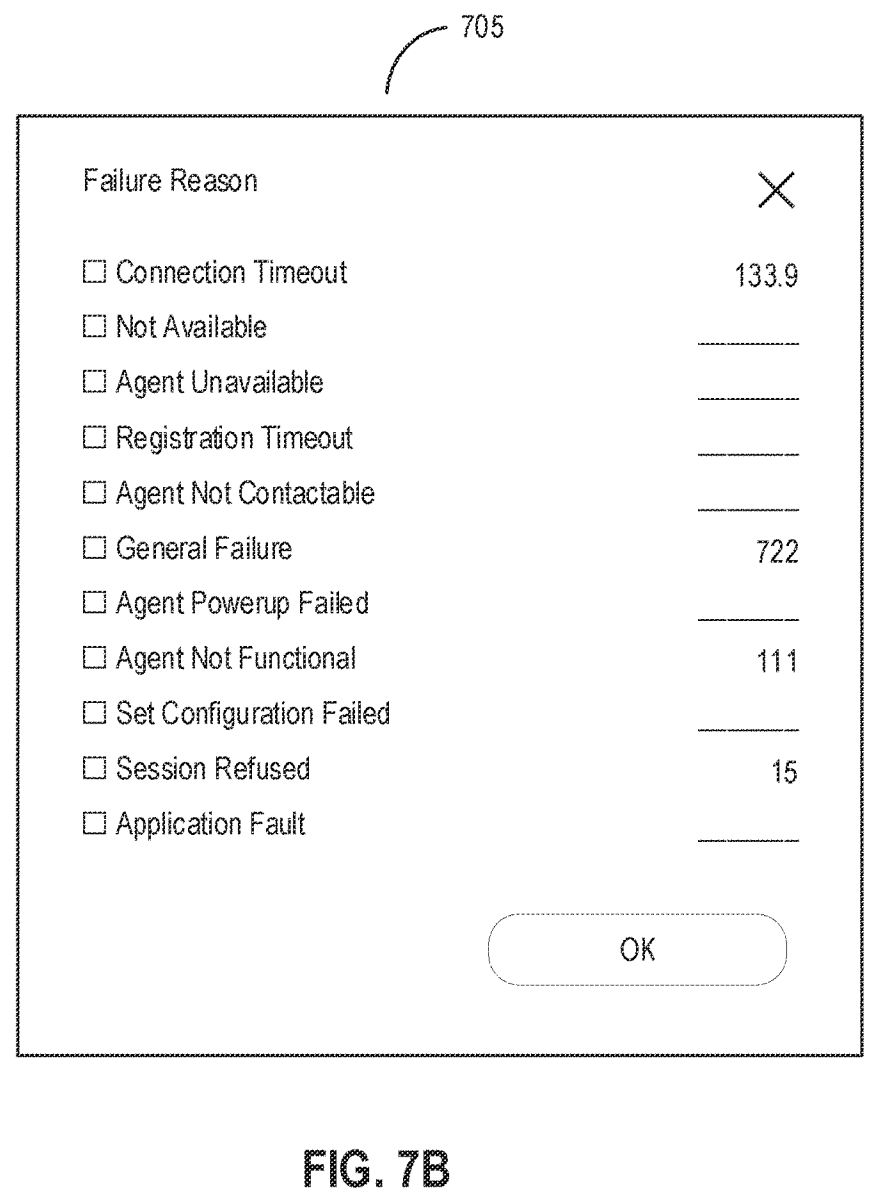

705

Failure Reason                                    X

☐ Connection Timeout                         133.9

☐ Not Available                                   ____

☐ Agent Unavailable                            ____

☐ Registration Timeout                         ____

☐ Agent Not Contactable                     ____

☐ General Failure                                 722

☐ Agent Powerup Failed                       ____

☐ Agent Not Functional                        111

☐ Set Configuration Failed                    ____

☐ Session Refused                               15

☐ Application Fault                               ____

CORRELATING SESSION FAILURES WITH APPLICATION FAULTS FROM APPLICATION UPGRADES

FIELD OF THE DISCLOSURE

The present application generally relates to computer networks. In particular, the present application relates to systems and methods for determining whether session failures are correlated with application faults due to upgrades.

BACKGROUND

From time to time, an application may be updated from one version to a subsequent version to modify or add features for a user of the application. Due to various factors, a user experience with the application may vary.

BRIEF SUMMARY

In a networked environment, an application may be hosted on a machine and may be accessible to a client via a virtual desktop over a communication session. The client may request to launch the session for accessing the application on the machine through the virtual desktop. As the client accesses various resources through the session, an expansive range of performance metrics measuring various factors may be acquired, such as application responsiveness, machine load, logon duration, network latency, jitter, and throughput, among others. Even with all these data, however, when the launch of the session fails or connectivity issues arise during the session, it may be difficult to deduce whether the cause of the failure is due to the application accessible through the session or network conditions affecting the session itself.

Instead, a system administrator may have to manually and tediously comb through the performance related data to ascertain what the exact cause of the failure is from a whole slew of potential causes, such as a machine becoming stuck in boot, unavailable capacity, unreachability of the machine, or endpoint connectivity, among several others. With the further consideration of applications running on these machines, it may be even more challenging for the system administrator to make the manual troubleshooting. This may be especially problematic, when the users are unable to use an application in the session.

One approach may involve testing in a separate environment or delivery group. To that end, a network administrator may expend enormous resources and time to familiarize themselves with the performance and stability of various versions of critical applications. With this familiarity, the network administrator may first test a newer version in a separate environment (e.g., a sandbox environment) or with a separate group of clients in the enterprise environment. Then from the results of the test, the administrator may proceed to production and use application tagging to pinpoint applications with problematic updates. Even with the testing, rolling out upgrades to application may still lead to poor user experience or degradation in application performance. Furthermore, the administrator may again have to manually examine the performance data to establish whether the poor performance was due to application faults and not underlying issues with the session or the machine through which the application is provided.

To address these and other technical challenges, a performance analytics service may leverage the performance data to correlate a session failure to application failure. Using the correlations, the performance analytics service may determine whether the cause of the failure in the session is attributable to the upgrade to the application. Based on the determination and other data, the performance analytics service may provide a system administrator a comprehensive report and insight on application with degradations in performance due to application upgrades. Armed with this information, the administrator may have higher confidence in diagnostics and decision to take countermeasures to address the degradations in performance. The performance analytics service may also automatically relay instructions to rollback applications to versions identified as stable. In conjunction with the administrator, the performance analytics service may also provide a custom script configured by the administrator to run on the machine on which applications are installed to recover the machine or application from faults.

To that end, the performance analytics service may pinpoint degradations in a newer version of the application on machines. In identifying, the performance analytics service may gather historical performance metrics of applications of a prior version hosted on machines. The performance analytics service may collect performance metrics of applications of the newer version. The performance metrics from the newer version may be from machines in a test environment or a group of clients testing the newer version. Data from older versions of the application may be distinguished from the data of newer versions using application tagging. With the aggregation of these two datasets, the performance analytics service may find instances of faults or errors across both versions of the application. The performance analytics service may use statistical analysis methods (e.g., as A/B testing or fixed thresholding) to determine whether the application with the newer version has higher rates of errors or faults or has degradation in performance. The performance analytics service may provide an alert or detailed reports to the administrator to show insights regarding the versions of the application.

In addition, the performance analytics service may determine whether connection failures in sessions are attributable to application faults or errors. Once a failure in a session is detected (e.g., reported by user or automatically identified), the performance analytics services may identify the performance metrics for the application on the machine for the session. The metrics may be recorded by a gateway (e.g., a connection broker) or on the machine itself. The performance analytics service may perform correlation analysis between the application faults with failures in the session. If the analysis indicates that the application fault is related to the failure in the session, the performance analytics service may determine that the application fault is attributable to the failure in the session. The performance analytics service may mark or tag the failure as application-related and the application fault as a potential cause for the failure in the session.

For instance, from the session related data for one enterprise environment, the performance analytics service may have identified over 200,000 recorded sessions, with over 8,500 failures. From the application performance metrics, the performance analytics service may identify the number of application faults as over 4,500. Using these and other data, the performance analytics service may calculate that percentage of session failures with unknown causes is over 75%, and determine that the failures are application-related. In another example, from the session related data for another enterprise environment, the performance analytics service may have identified over 58,000 sessions as reported by users, with over 87,000 failures. From the application performance metrics, the performance analytics service may identify the number of application faults as almost 200,000. Based on these and other data, the performance analytics service may calculate that the percentage of session failures with unknown causes is almost 33%, and determine that the failures are application-related.

In both these examples, the performance analytics service may determine that sizable session failures experienced by users could be application related and unrelated with the underlying network or machine infrastructure. From the more than 25% of the session failures, the performance analytics service may eliminate infrastructure-related issues (e.g., network connectivity or the machine itself) as the cause of the session failure. In the second example, the application-related failure events may be more than the number of sessions launched. Although the application faults observed from machines do not lead session failures reported by users, the application-related faults may contribute to an increase in application faults. If the information provided by the performance analytics service can fix some of the application-related failures, the service may contribute to a considerable improvement in user experience.

Based on the determination of the cause of the failure in the session, the performance analytics service may generate and provide outputs for the network. The performance analytics service may automatically provide a command to the machine to roll back the version of the application on the machine to a more stable version. The performance analytics service also may invoke an environment management service to run custom scripts (e.g., composed by the administrator or provided to the service) to fix or address issues found in the application without administrator intervention. In addition, the performance analytics service may provide the statistics information for presentation to the network administrator via a user interface console. The information may show users and affected delivery groups, and application metadata (e.g., version, path, and processes), among others.

In this manner, the performance analytics service may use session data and application performance metrics to carry out correlation analysis to determine whether a cause for a failure of a session is attributed to a fault in an application due to an upgrade. Based on the determination, the performance analytics service may automatically correct application faults by issuing commands or providing scripts to address the issues attributed to the faults. These commands may directly address the degradation in performance from the application upgrade, thereby improving machine performance and user experience of the machine. Moreover, the performance analytics service may also provide valuable information regarding the session failures and application faults to the system administrator. With this information, the administrator may be able to better troubleshoot and assess the session, machine, application, and upgrades, and take countermeasures with higher confidence at addressing the degradation in performance.

Aspects of the disclosure are directed to systems, methods, and non-transitory computer-readable media for determining an upgrade to an application as a cause of a failure in a session. A device may detect a failure in a session via which a client is accessing a first version of an application. The device may identify, in response to detecting the failure, first performance metrics for the first version of the application and second performance metrics for a second version of the application. The device may determine, based at least on the failure, the first performance metrics, and the second performance metrics, that an upgrade to the application to the first version from the second version is a cause of the failure in the session. The device may store an association between the first version of the application and the determination that the upgrade is the cause of the failure in the session.

In some embodiments, the device may determine, for a second failure in a second session via which a second client is accessing a third version of the application, that a second upgrade to the application to the third version is not a cause of the second failure in the second session based at least on the second failure, the second performance metrics, third performance metrics for the third version. In some embodiments, the device may store a second association between the third version of the application and a determination that the second upgrade is the second cause of the second failure in the second session.

In some embodiments, the device may provide, to a machine on which the application is hosted, instructions to handle a degradation in the first version of the application, responsive to determining that the upgrade is the cause of the failure. In some embodiments, the device may select, from a plurality of versions of the application, the second version responsive to a determination that the second version is stable based at least on the second performance metrics.

In some embodiments, the device may provide, to an administrator, an indication that the upgrade to the application is the cause of the failure in the session. In some embodiments, the device may provide, to an administrator for presentation on a user interface, analytics information based at least on the first performance metrics, the second performance metrics, and the association. In some embodiments, the device may identify a plurality of users affected by the upgrade to the application based at least access by each of a plurality of clients of the first version of the application.

In some embodiments, the device may identify (i) the first performance metrics from a first group of clients using the first version of the application and (ii) the second performance metrics from a second group of clients using the second version of the application. In some embodiments, the device may identify (i) the first performance metrics for a plurality of clients over a first time period during which the first version is used and (ii) the second performance metrics for at least one of the plurality of clients over a second time period during which the second version is used.

In some embodiments, the device may determine a correlation between the upgrade to the application with the failure in the session as a function of the first performance metrics, the second performance metrics, and session data of a plurality of clients accessing the application.

BRIEF DESCRIPTION OF THE FIGURES

The foregoing and other objects, aspects, features, and advantages of the present solution will become more apparent and better understood by referring to the following description taken in conjunction with the accompanying drawings, in which:

FIGS. 7A-C are screenshots of user interfaces presenting analytics information in the system for correlating session failures with application faults in accordance with an illustrative embodiment.

Figure 1A:
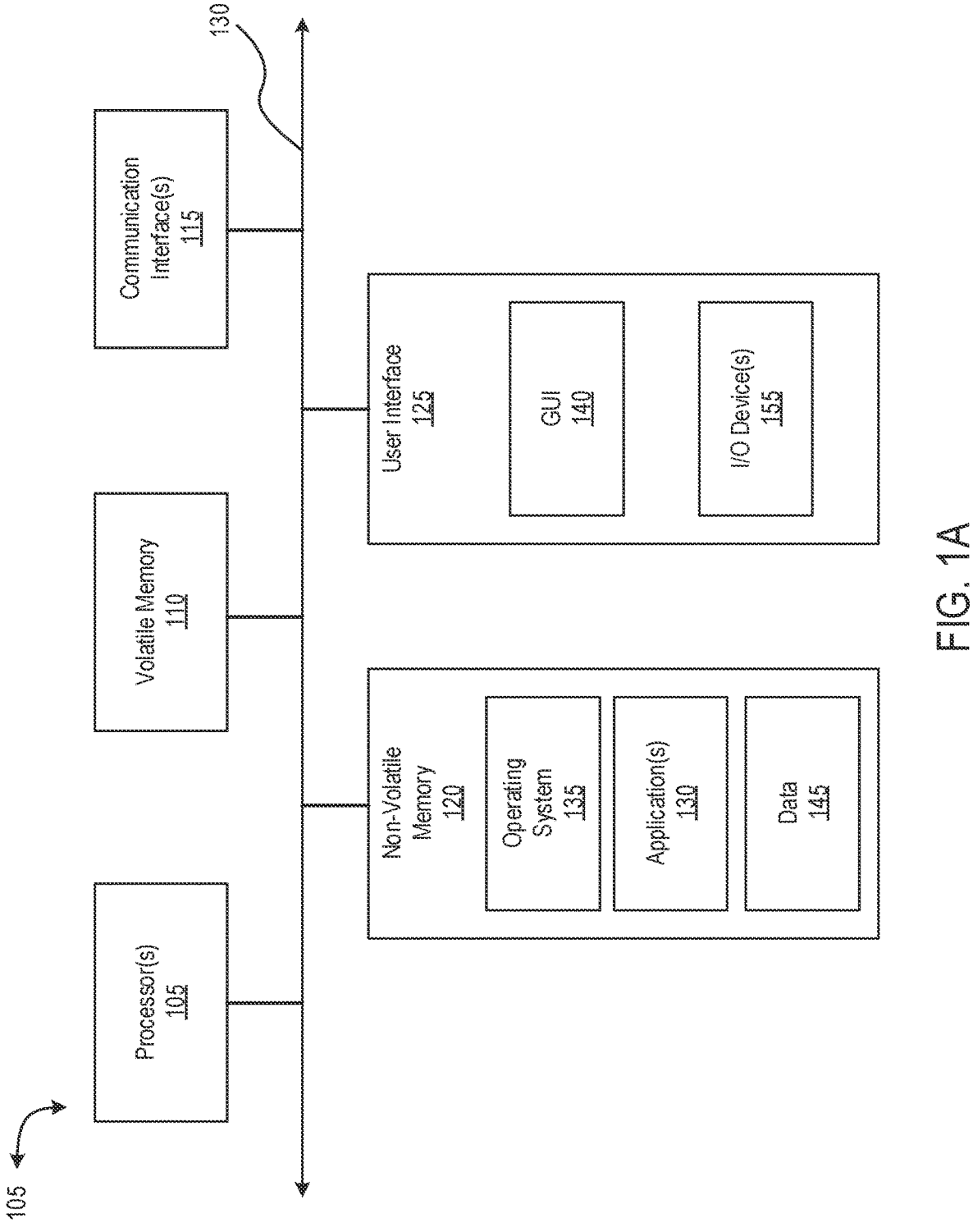
FIG. 1A is a block diagram of embodiments of a computing device.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a computing environment which may be useful for practicing embodiments described herein;

Section B describes resource management services for managing and streamlining access by clients to resource feeds; and Section C describes systems and methods for correlating session failures with application faults from upgrades.

A. Computing Environment

Prior to discussing the specifics of embodiments of the systems and methods of an appliance and/or client, it may be helpful to discuss the computing environments in which such embodiments may be deployed.

As shown in FIG. 1A, computer 100 may include one or more processors 105, volatile memory 110 (e.g., random access memory (RAM)), non-volatile memory 130 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 125, one or more communications interfaces 135, and communication bus 130. User interface 125 may include graphical user interface (GUI) 150 (e.g., a touchscreen, a display, etc.) and one or more input/output (I/O) devices 155 (e.g., a mouse, a keyboard, a microphone, one or more speakers, one or more cameras, one or more biometric scanners, one or more environmental sensors, one or more accelerometers, etc.). Non-volatile memory 130 stores operating system 135, one or more applications 140, and data 145 such that, for example, computer instructions of operating system 135 and/or applications 140 are executed by processor(s) 105 out of volatile memory 110. In some embodiments, volatile memory 110 may include one or more types of RAM and/or a cache memory that may offer a faster response time than a main memory. Data may be entered using an input device of GUI 150 or received from I/O device(s) 155. Various elements of computer 100 may communicate via one or more communication buses, shown as communication bus 130.

Computer 100 as shown in FIG. 1A is shown merely as an example, as clients, servers, intermediary and other networking devices and may be implemented by any computing or processing environment and with any type of machine or set of machines that may have suitable hardware and/or software capable of operating as described herein. Processor(s) 105 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multicore processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 135 may include one or more interfaces to enable computer 100 to access a computer network such as a Local Area Network (LAN), a Wide Area Network (WAN), a Personal Area Network (PAN), or the Internet through a variety of wired and/or wireless or cellular connections.

In described embodiments, the computing device 100 may execute an application on behalf of a user of a client computing device. For example, the computing device 100 may execute a virtual machine, which provides an execution session within which applications execute on behalf of a user or a client computing device, such as a hosted desktop session. The computing device 100 may also execute a terminal services session to provide a hosted desktop environment. The computing device 100 may provide access to a computing environment including one or more of: one or more applications, one or more desktop applications, and one or more desktop sessions in which one or more applications may execute.

Figure 1B:
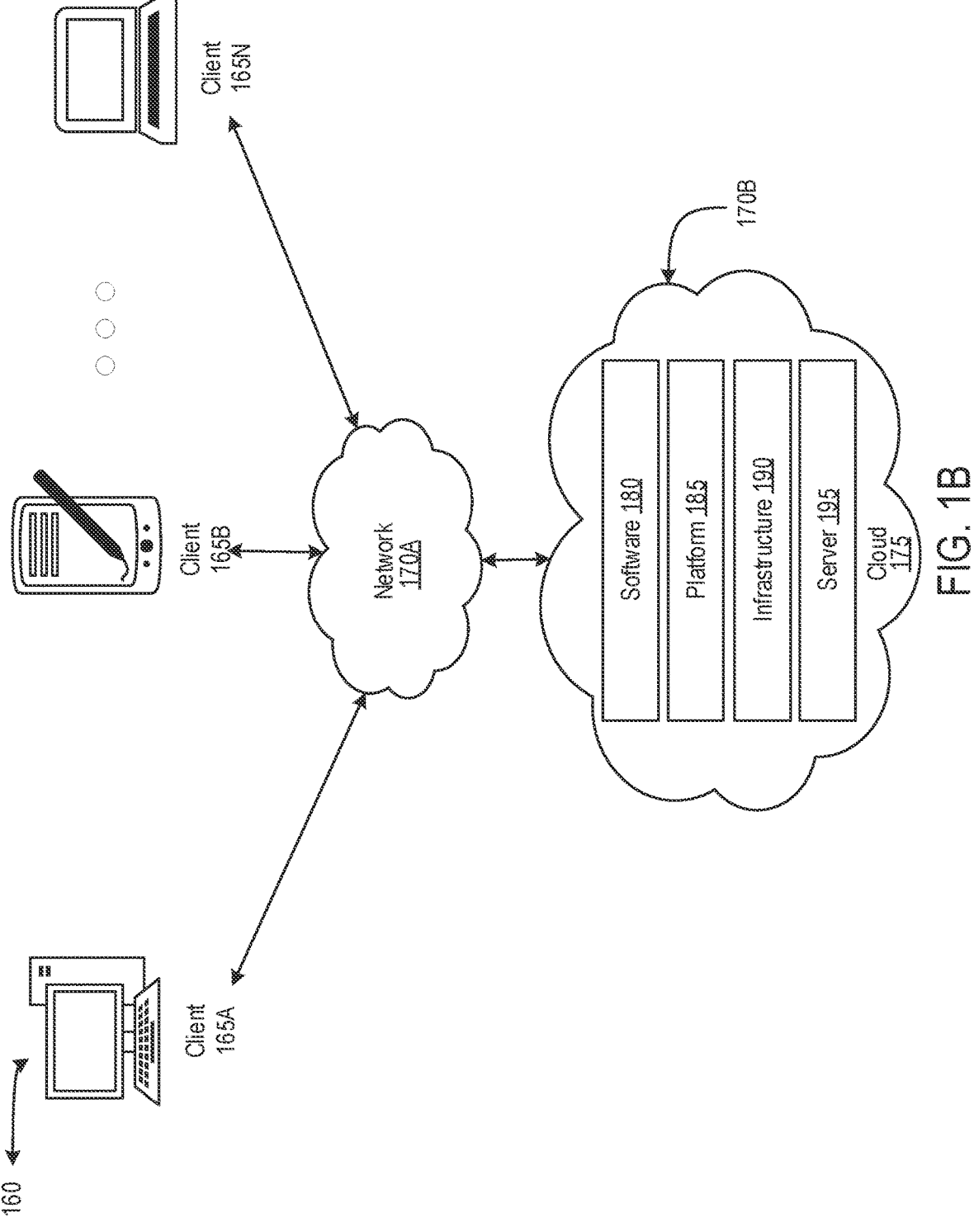
FIG. 1B is a block diagram depicting a computing environment comprising client device in communication with cloud service providers.

Referring to FIG. 1B, a computing environment 160 is depicted. Computing environment 160 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but not limited to, networks, network bandwidth, servers, processing, memory, storage, applications, virtual machines, databases, software, hardware, analytics, and intelligence.

In embodiments, the computing environment 160 may provide client 165 with one or more resources provided by a network environment. The computing environment 165 may include one or more client's 165a-165n, in communication with a cloud 175 over one or more networks 170. Clients 165 may include, e.g., thick clients, thin clients, and zero clients. The cloud 108 may include back end platforms, e.g., servers, storage, server farms or data centers. The clients 165 can be the same as or substantially similar to computer 100 of FIG. 1A.

The users or clients 165 can correspond to a single organization or multiple organizations. For example, the computing environment 160 can include a private cloud serving a single organization (e.g., enterprise cloud). The computing environment 160 can include a community cloud or public cloud serving multiple organizations. In embodiments, the computing environment 160 can include a hybrid cloud that is a combination of a public cloud and a private cloud. For example, the cloud 175 may be public, private, or hybrid. Public clouds 108 may include public servers that are maintained by third parties to the clients 165 or the owners of the clients 165. The servers may be located off-site in remote geographical locations as disclosed above or otherwise. Public clouds 175 may be connected to the servers over a public network 170. Private clouds 175 may include private servers that are physically maintained by clients 165 or owners of clients 165. Private clouds 175 may be connected to the servers over a private network 170. Hybrid clouds 175 may include both the private and public networks 170 and servers.

The cloud 175 may include back end platforms, e.g., servers, storage, server farms or data centers. For example, the cloud 175 can include or correspond to a server or system remote from one or more clients 165 to provide third party control over a pool of shared services and resources. The computing environment 160 can provide resource pooling to serve multiple users via clients 165 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In embodiments, the computing environment 160 can provide on-demand self-service to unilaterally provision computing capabilities (e.g., server time, network storage) across a network for multiple clients 165. The computing environment 160 can provide an elasticity to dynamically scale out or scale in responsive to different demands from one or more clients 165. In some embodiments, the computing environment 160 can include or provide monitoring services to monitor, control and/or generate reports corresponding to the provided shared services and resources.

In some embodiments, the computing environment 160 can include and provide different types of cloud computing services. For example, the computing environment 160 can include Infrastructure as a service (IaaS). The computing environment 160 can include Platform as a service (PaaS). The computing environment 160 can include server-less computing. The computing environment 160 can include Software as a service (SaaS). For example, the cloud 175 may also include a cloud based delivery, e.g. Software as a Service (SaaS) 180, Platform as a Service (PaaS) 185, and Infrastructure as a Service (IaaS) 190. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon. com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by Right-Scale, Inc., of Santa Barbara, California. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Clients 165 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 165 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 165 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, California). Clients 165 may also access SaaS resources through smartphone or tablet applications, including, e.g., Salesforce Sales Cloud, or Google Drive app. Clients 165 may also access SaaS resources through the client operating system, including, e.g., Windows file system for DROP-BOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 2A:
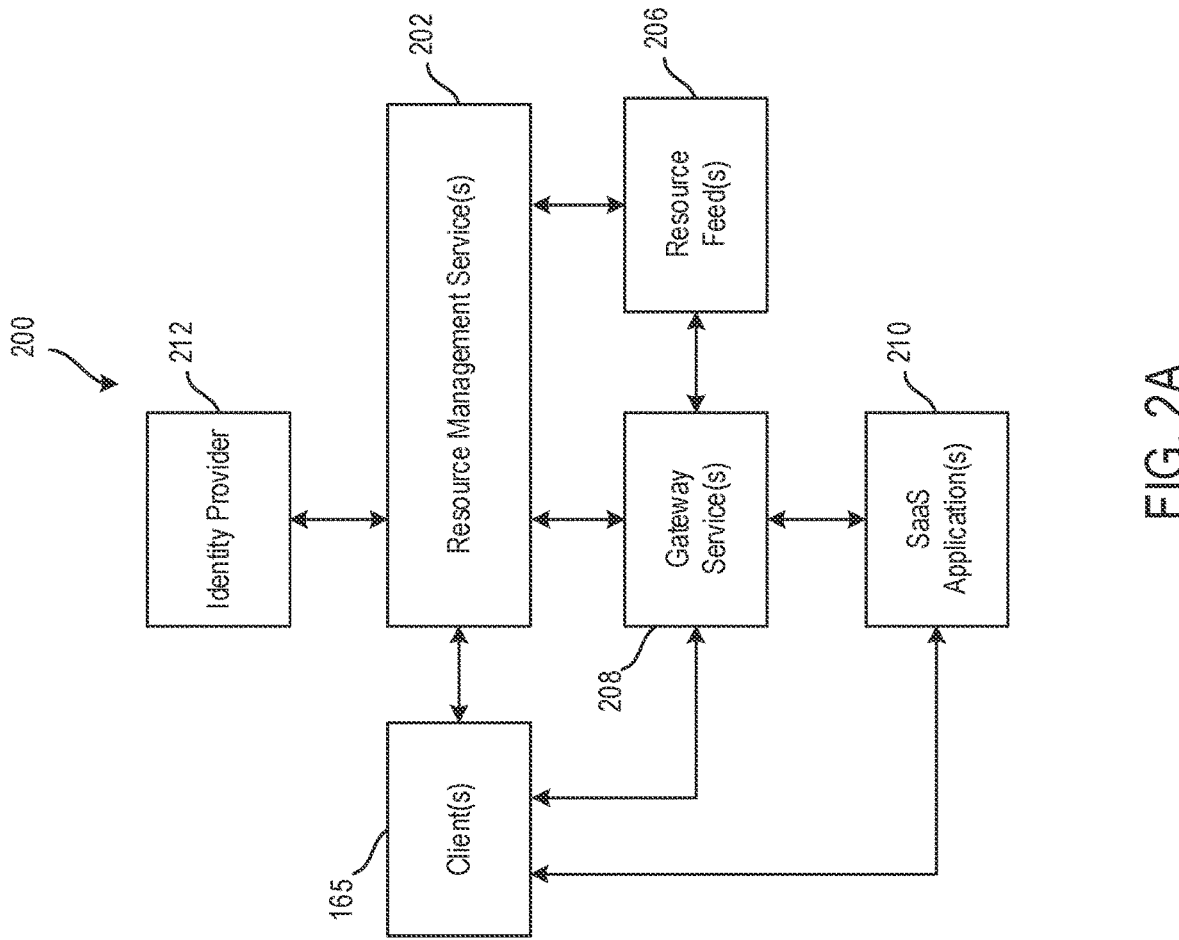
FIG. 2A is a block diagram of an example system in which resource management services may manage and streamline access by clients to resource feeds (via one or more gateway services) and/or software-as-a-service (SaaS) applications.

B. Resource Management Services for Managing and Streamlining Access by Clients to Resource Feeds FIG. 2A is a block diagram of an example system 200 in which one or more resource management services 202 may manage and streamline access by one or more clients 202 to one or more resource feeds 206 (via one or more gateway services 208) and/or one or more software-as-a-service (SaaS) applications 210. In particular, the resource management service(s) 202 may employ an identity provider 212 to authenticate the identity of a user of a client 165 and, following authentication, identify one of more resources the user is authorized to access. In response to the user selecting one of the identified resources, the resource management service(s) 202 may send appropriate access credentials to the requesting client 165, and the client 165 may then use those credentials to access the selected resource. For the resource feed(s) 206, the client 165 may use the supplied credentials to access the selected resource via a gateway service 208. For the SaaS application(s) 210, the client 165 may use the credentials to access the selected application directly.

The client(s) 202 may be any type of computing devices capable of accessing the resource feed(s) 206 and/or the SaaS application(s) 210, and may, for example, include a variety of desktop or laptop computers, smartphones, tablets, etc. The resource feed(s) 206 may include any of numerous resource types and may be provided from any of numerous locations. In some embodiments, for example, the resource feed(s) 206 may include one or more systems or services for providing virtual applications and/or desktops to the client(s) 202, one or more file repositories and/or file sharing systems, one or more secure browser services, one or more access control services for the SaaS applications 210, one or more management services for local applications on the client(s) 202, one or more internet enabled devices or sensors, etc. Each of the resource management service(s) 202, the resource feed(s) 206, the gateway service(s) 208, the SaaS application(s) 210, and the identity provider 212 may be located within an on-premises data center of an organization for which the system 200 is deployed, within one or more cloud computing environments, or elsewhere.

Figure 2B:
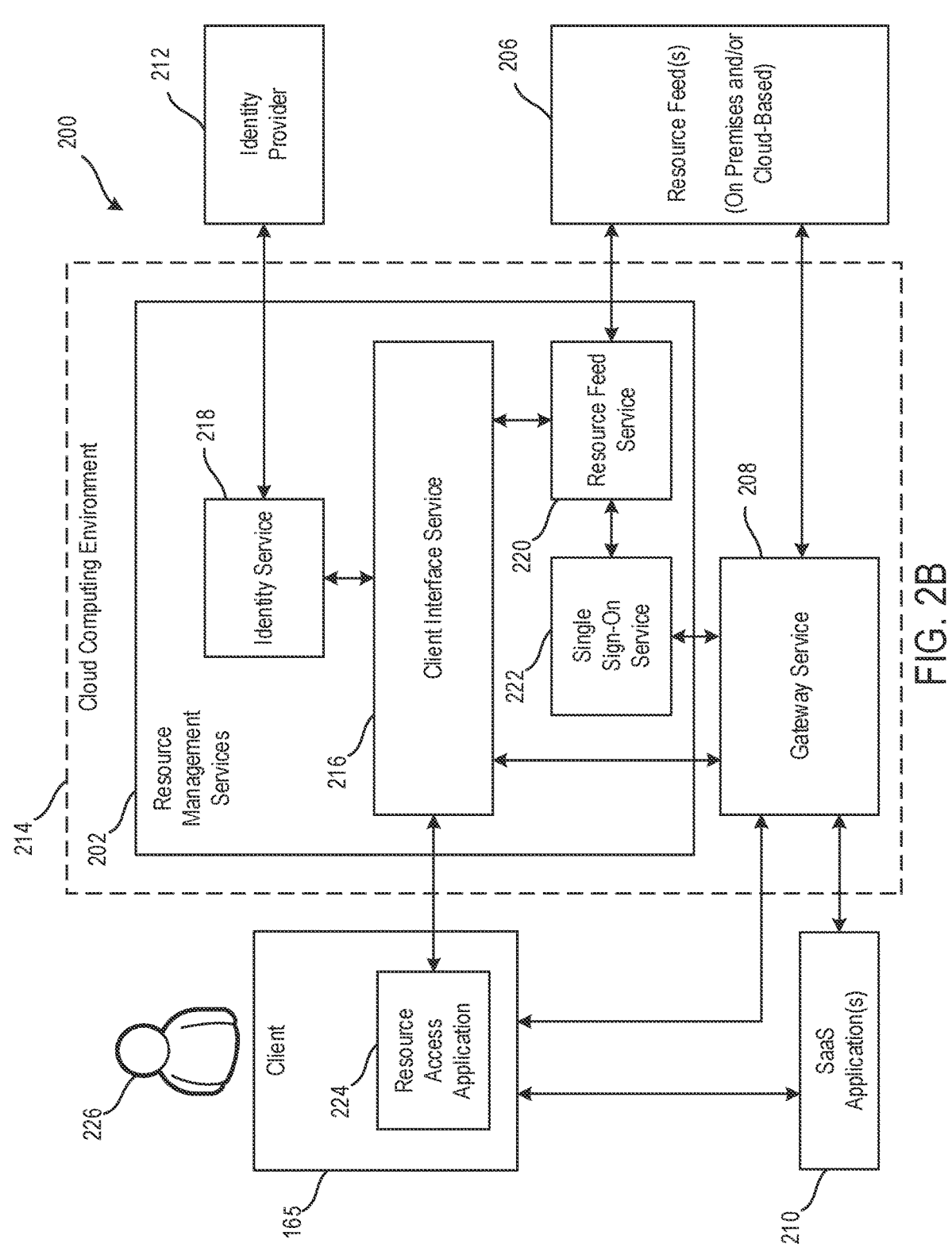
FIG. 2B is a block diagram showing an example implementation of the system shown in FIG. 2A in which various resource management services as well as a gateway service are located within a cloud computing environment.

FIG. 2B is a block diagram showing an example implementation of the system 200 shown in FIG. 2A in which various resource management services 202 as well as a gateway service 208 are located within a cloud computing environment 214. The cloud computing environment may, for example, include Microsoft Azure Cloud, Amazon Web Services, Google Cloud, or IBM Cloud.

For any of illustrated components (other than the client 165) that are not based within the cloud computing environment 214, cloud connectors (not shown in FIG. 2B) may be used to interface those components with the cloud computing environment 214. Such cloud connectors may, for example, run on Windows Server instances hosted in resource locations and may create a reverse proxy to route traffic between the site(s) and the cloud computing environment 214. In the illustrated example, the cloud-based resource management services 202 include a client interface service 216, an identity service 218, a resource feed service 220, and a single sign-on service 222. As shown, in some embodiments, the client 165 may use a resource access application 224 to communicate with the client interface service 216 as well as to present a user interface on the client 165 that a user 226 can operate to access the resource feed(s) 206 and/or the SaaS application(s) 210. The resource access application 224 may either be installed on the client 165, or may be executed by the client interface service 216 (or elsewhere in the system 200) and accessed using a web browser (not shown in FIG. 2B) on the client 165.

As explained in more detail below, in some embodiments, the resource access application 224 and associated components may provide the user 226 with a personalized, all-in-one interface enabling instant and seamless access to all the user's SaaS and web applications, files, virtual Windows applications, virtual Linux applications, desktops, mobile applications, such as Citrix DaaS™ (formerly Citrix Virtual Apps and Desktops, XenApp® or XenDesktop®), local applications, and other data.

When the resource access application 224 is launched or otherwise accessed by the user 226, the client interface service 216 may send a sign-on request to the identity service 218. In some embodiments, the identity provider 212 may be located on the premises of the organization for which the system 200 is deployed. The identity provider 212 may, for example, correspond to an on-premises Windows Active Directory. In such embodiments, the identity provider 212 may be connected to the cloud-based identity service 218 using a cloud connector (not shown in FIG. 2B), as described above. Upon receiving a sign-on request, the identity service 218 may cause the resource access application 224 (via the client interface service 216) to prompt the user 226 for the user's authentication credentials (e.g., user-name and password). Upon receiving the user's authentication credentials, the client interface service 216 may pass the credentials along to the identity service 218, and the identity service 218 may, in turn, forward them to the identity provider 212 for authentication, for example, by comparing them against an Active Directory domain. Once the identity service 218 receives confirmation from the identity provider 212 that the user's identity has been properly authenticated, the client interface service 216 may send a request to the resource feed service 220 for a list of subscribed resources for the user 226.

In other embodiments (not illustrated in FIG. 2B), the identity provider 212 may be a cloud-based identity service, such as a Microsoft Azure Active Directory. In such embodiments, upon receiving a sign-on request from the client interface service 216, the identity service 218 may, via the client interface service 216, cause the client 165 to be redirected to the cloud-based identity service to complete an authentication process. The cloud-based identity service may then cause the client 165 to prompt the user 226 to enter the user's authentication credentials. Upon determining the user's identity has been properly authenticated, the cloud-based identity service may send a message to the resource access application 224 indicating the authentication attempt was successful, and the resource access application 224 may then inform the client interface service 216 of the successfully authentication. Once the identity service 218 receives confirmation from the client interface service 216 that the user's identity has been properly authenticated, the client interface service 216 may send a request to the resource feed service 220 for a list of subscribed resources for the user 226.

For each configured resource feed, the resource feed service 220 may request an identity token from the single sign-on service 222. The resource feed service 220 may then pass the feed-specific identity tokens it receives to the points of authentication for the respective resource feeds 206. Each resource feed 206 may then respond with a list of resources configured for the respective identity. The resource feed service 220 may then aggregate all items from the different feeds and forward them to the client interface service 216, which may cause the resource access application 224 to present a list of available resources on a user interface of the client 165. The list of available resources may, for example, be presented on the user interface of the client 165 as a set of selectable icons or other elements corresponding to accessible resources. The resources so identified may, for example, include one or more virtual applications and/or desktops (e.g., Citrix DaaS™ (formerly Citrix Virtual Apps and Desktops, XenApp® or XenDesktop®), VMware Horizon, Microsoft RDS, etc.), one or more file repositories and/or file sharing systems (e.g., Sharefile®, one or more secure browsers, one or more internet enabled devices or sensors, one or more local applications installed on the client 165, and/or one or more SaaS applications 210 to which the user 226 has subscribed. The lists of local applications and the SaaS applications 210 may, for example, be supplied by resource feeds 206 for respective services that manage which such applications are to be made available to the user 226 via the resource access application 224. Examples of SaaS applications 210 that may be managed and accessed as described herein include Microsoft Office 365 applications, SAP SaaS applications, Workday applications, etc.

For resources other than local applications and the SaaS application(s) 210, upon the user 226 selecting one of the listed available resources, the resource access application 224 may cause the client interface service 216 to forward a request for the specified resource to the resource feed service 220. In response to receiving such a request, the resource feed service 220 may request an identity token for the corresponding feed from the single sign-on service 222. The resource feed service 220 may then pass the identity token received from the single sign-on service 222 to the client interface service 216 where a launch ticket for the resource may be generated and sent to the resource access application 224. Upon receiving the launch ticket, the resource access application 224 may initiate a secure session to the gateway service 208 and present the launch ticket. When the gateway service 208 is presented with the launch ticket, it may initiate a secure session to the appropriate resource feed and present the identity token to that feed to seamlessly authenticate the user 226. Once the session initializes, the client 165 may proceed to access the selected resource.

When the user 226 selects a local application, the resource access application 224 may cause the selected local application to launch on the client 165. When the user 226 selects a SaaS application 210, the resource access application 224 may cause the client interface service 216 request a one-time uniform resource locator (URL) from the gateway service 208 as well a preferred browser for use in accessing the SaaS application 210. After the gateway service 208 returns the one-time URL and identifies the preferred browser, the client interface service 216 may pass that information along to the resource access application 224. The client 165 may then launch the identified browser and initiate a connection to the gateway service 208. The gateway service 208 may then request an assertion from the single sign-on service 222. Upon receiving the assertion, the gateway service 208 may cause the identified browser on the client 165 to be redirected to the logon page for identified SaaS application 210 and present the assertion. The SaaS may then contact the gateway service 208 to validate the assertion and authenticate the user 226. Once the user has been authenticated, communication may occur directly between the identified browser and the selected SaaS application 210, thus allowing the user 226 to use the client 165 to access the selected SaaS application 210.

In some embodiments, the preferred browser identified by the gateway service 208 may be a specialized browser embedded in the resource access application 224 (when the resource application is installed on the client 165) or provided by one of the resource feeds 206 (when the resource application 224 is located remotely), e.g., via a secure browser service. In such embodiments, the SaaS applications 210 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 165 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 206) for assessment of its security risk by a web filtering service. For approved URLs, the specialized browser may be permitted to access the link. For suspicious links, however, the web filtering service may have the client interface service 216 send the link to a secure browser service, which may start a new virtual browser session with the client 165, and thus allow the user to access the potentially harmful linked content in a safe environment.

In some embodiments, in addition to or in lieu of providing the user 226 with a list of resources that are available to be accessed individually, as described above, the user 226 may instead be permitted to choose to access a streamlined feed of event notifications and/or available actions that may be taken with respect to events that are automatically detected with respect to one or more of the resources. This streamlined resource activity feed, which may be customized for each user 226, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to each event right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 202 to notify a user 226 of something that requires the user's attention (e.g., approval of an expense report, new course available for registration, etc.).

Figure 2C:
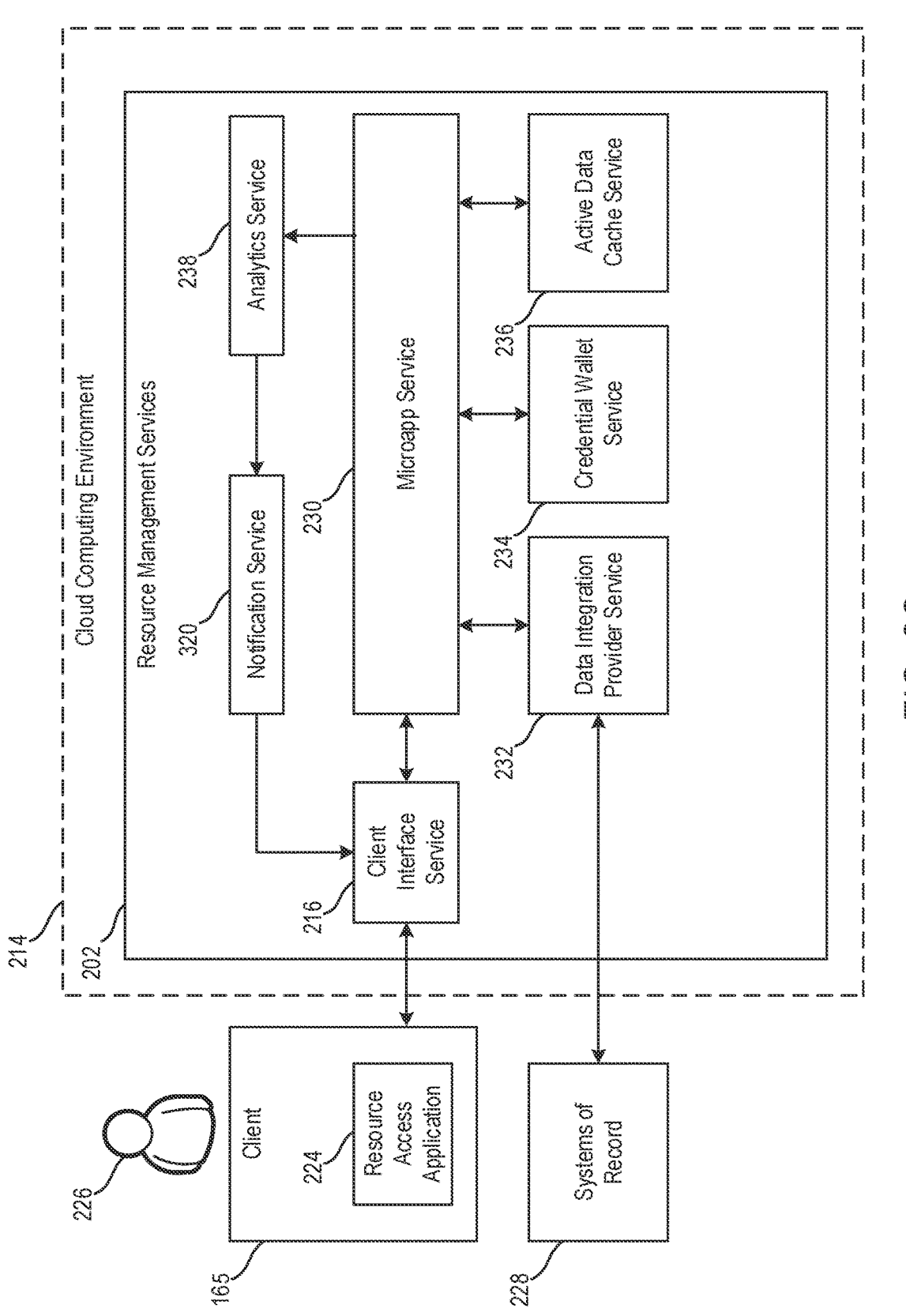
FIG. 2C is a block diagram similar to that shown in FIG. 2B but in which the available resources are represented by a single box labeled "systems of record," and further in which several different services are included among the resource management services.

FIG. 2C is a block diagram similar to that shown in FIG. 2B but in which the available resources (e.g., SaaS applications, web applications, Windows applications, Linux applications, desktops, file repositories and/or file sharing systems, and other data) are represented by a single box 228 labeled "systems of record," and further in which several different services are included within the resource management services block 202. As explained below, the services shown in FIG. 2C may enable the provision of a streamlined resource activity feed and/or notification process for a client 165. In the example shown, in addition to the client interface service 216 discussed above, the illustrated services include a microapp service 230, a data integration provider service 232, a credential wallet service 234, an active data cache service 236, an analytics service 238, and a notification service 240. In various embodiments, the services shown in FIG. 2C may be employed either in addition to or instead of the different services shown in FIG. 2B.

In some embodiments, a microapp may be a single use case made available to users to streamline functionality from complex enterprise applications. Microapps may, for example, utilize APIs available within SaaS, web, or home-grown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 224 without having to launch the native application. The system shown in FIG. 2C may, for example, aggregate relevant notifications, tasks, and insights, and thereby give the user 226 a dynamic productivity tool. In some embodiments, the resource activity feed may be intelligently populated by utilizing machine learning and artificial intelligence (AI) algorithms. Further, in some implementations, microapps may be configured within the cloud computing environment 214, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 2C, the systems of record 228 may represent the applications and/or other resources the resource management services 202 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 202, and in particular the data integration provider service 232, may, for example, support REST API, JSON, OData-JSON, and 6ML. As explained in more detail below, the data integration provider service 232 may also write back to the systems of record, for example, using OAuth2 or a service account.

In some embodiments, the microapp service 230 may be a single-tenant service responsible for creating the microapps. The microapp service 230 may send raw events, pulled from the systems of record 228, to the analytics service 238 for processing. The microapp service may, for example, periodically pull active data from the systems of record 228.

In some embodiments, the active data cache service 236 may be single-tenant and may store all configuration information and microapp data. It may, for example, utilize a per-tenant database encryption key and per-tenant database credentials.

In some embodiments, the credential wallet service 234 may store encrypted service credentials for the systems of record 228 and user OAuth2 tokens.

In some embodiments, the data integration provider service 232 may interact with the systems of record 228 to decrypt end-user credentials and write back actions to systems of record 228 under the identity of the end-user. The write-back actions may, for example, utilize a user's actual account to ensure all actions performed are compliant with data policies of the application or other resource being interacted with.

In some embodiments, the analytics service 238 may process the raw events received from the microapps service 230 to create targeted scored notifications and send such notifications to the notification service 240.

Finally, in some embodiments, the notification service 240 may process any notifications it receives from the analytics service 238. In some implementations, the notification service 240 may store the notifications in a database to be later served in a notification feed. In other embodiments, the notification service 240 may additionally or alternatively send the notifications out immediately to the client 165 as a push notification to the user 226.

In some embodiments, a process for synchronizing with the systems of record 228 and generating notifications may operate as follows. The microapp service 230 may retrieve encrypted service account credentials for the systems of record 228 from the credential wallet service 234 and request a sync with the data integration provider service 232.

The data integration provider service 232 may then decrypt the service account credentials and use those credentials to retrieve data from the systems of record 228. The data integration provider service 232 may then stream the retrieved data to the microapp service 230. The microapp service 230 may store the received systems of record data in the active data cache service 236 and also send raw events to the analytics service 238. The analytics service 238 may create targeted scored notifications and send such notifications to the notification service 240. The notification service 240 may store the notifications in a database to be later served in a notification feed and/or may send the notifications out immediately to the client 165 as a push notification to the user 226.

In some embodiments, a process for processing a user-initiated action via a microapp may operate as follows. The client 165 may receive data from the microapp service 230 (via the client interface service 216) to render information corresponding to the microapp. The microapp service 230 may receive data from the active data cache service 236 to support that rendering. The user 226 may invoke an action from the microapp, causing the resource access application 224 to send that action to the microapp service 230 (via the client interface service 216). The microapp service 230 may then retrieve from the credential wallet service 234 an encrypted Oauth2 token for the system of record for which the action is to be invoked, and may send the action to the data integration provider service 232 together with the encrypted Oath2 token. The data integration provider service 232 may then decrypt the Oath2 token and write the action to the appropriate system of record under the identity of the user 226. The data integration provider service 232 may then read back changed data from the written-to system of record and send that changed data to the microapp service 230. The microapp service 232 may then update the active data cache service 236 with the updated data and cause a message to be sent to the resource access application 224 (via the client interface service 216) notifying the user 226 that the action was successfully completed.

In some embodiments, in addition to or in lieu of the functionality described above, the resource management services 202 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 202 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 202 may, for example, parse these requests and respond because they are integrated with multiple systems on the back-end. In some embodiments, users may be able to interact with the virtual assistance through either the resource access application 224 or directly from another resource, such as Microsoft Teams. This feature may allow employees to work efficiently, stay organized, and deliver only the specific information they are looking for.

C. Correlating Session Failures with Application Faults from Upgrades

Figure 3:
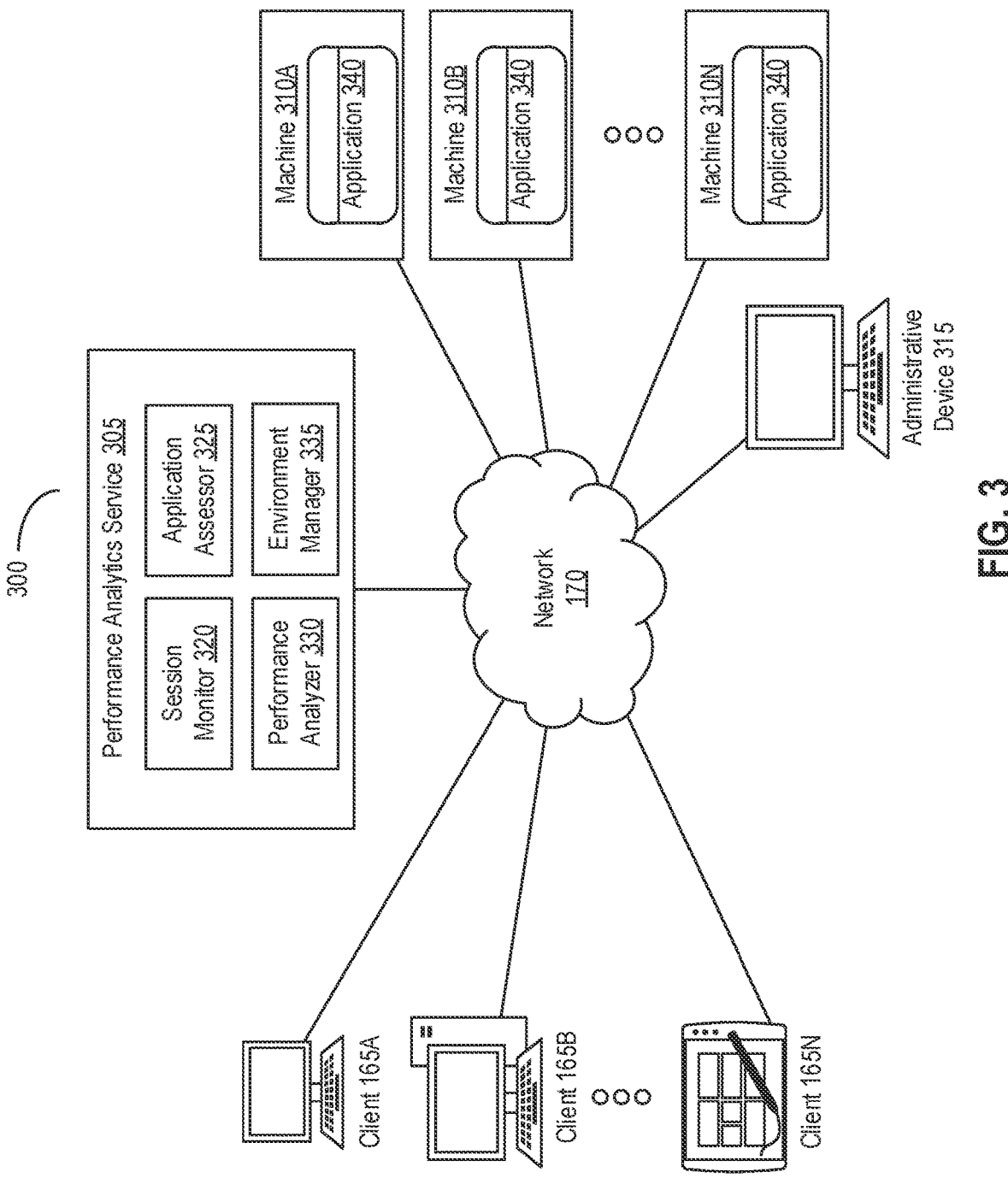
FIG. 3 is a block diagram of an embodiment of a system for correlating session failures with application faults from upgrades in accordance with an illustrative embodiment.

Referring now to FIG. 3, depicted is a block diagram of a system 300 for correlating session failures with application faults from upgrades. In overview, the system 300 may include at least one performance analytics service 305, a set of machines 310A-N (hereinafter generally referred to as machines 310), at least one administrative device 315, and one or more clients 165A-N (hereinafter generally referred to as client 165), communicatively coupled with one another via at least one network 170. The performance analytics service 305 may include at least one session monitor 320, at least one application assessor 325, at least one performance analyzer 330, and at least one environment manager 335. In some embodiments, the performance analytics service 305 and the administrative device 315 may be a part of the same device or may be separate devices (e.g., as depicted). Each machine 310 may be on a server (e.g., the server 195) or a gateway between the client 165 and the server. Each machine 310 may execute or include at least one application 340. In some embodiments, the machine 310 may correspond to a virtual machine (e.g., with a virtual delivery agent (VDA)) running on the client, the server, the gateway or one or more nodes on the cloud (e.g., the cloud 175 or cloud computing environment 214) to execute the application 340.

Each of the above-mentioned elements or entities is implemented in hardware, or a combination of hardware and software, in one or more embodiments. Each component of the system 300 may be implemented using hardware or a combination of hardware or software detailed above in connection with Sections A and B. For instance, each of these elements or entities can include any application, program, library, script, task, service, process or any type and form of executable instructions executing on hardware of the system 300, such as the performance analytics system 305 and its components (e.g., the session monitor 320, the application assessor 325, the performance analyzer 340, and the environment manager 335) and the machines 310 and its components (e.g., the application 340). The hardware includes circuitry such as one or more processors in one or more embodiments.

Each machine 310 may run or execute the application 340 for one or more sessions. The machine 310 may correspond to a remote virtual machine running on one or more network devices accessed via one of the clients 165. In some embodiments, the machine 310 may reside on a gateway (or proxy or appliance) between the client 165 and servers hosting resources for the application 340. In some embodiments, the machine 310 may reside on a server also hosting resources for the application 340. The application 340 may include an instance of an application, program, or programmable instructions running on the machine 310. For example, the application 340 may include an operating system service (e.g., a background process), a word processor, an email agent, a multimedia player, an image editor, a spreadsheet tool, a web browser, a video game, or an instant messaging program, among others. The application 340 may rely on computing resources local to the machine 310, such as a processor, memory, disk storage, and renderer (e.g., a graphical processor unit (GPU)), among others. The computing resources may be encapsulated in a virtual machine for the machine 310.

Figure 4A:
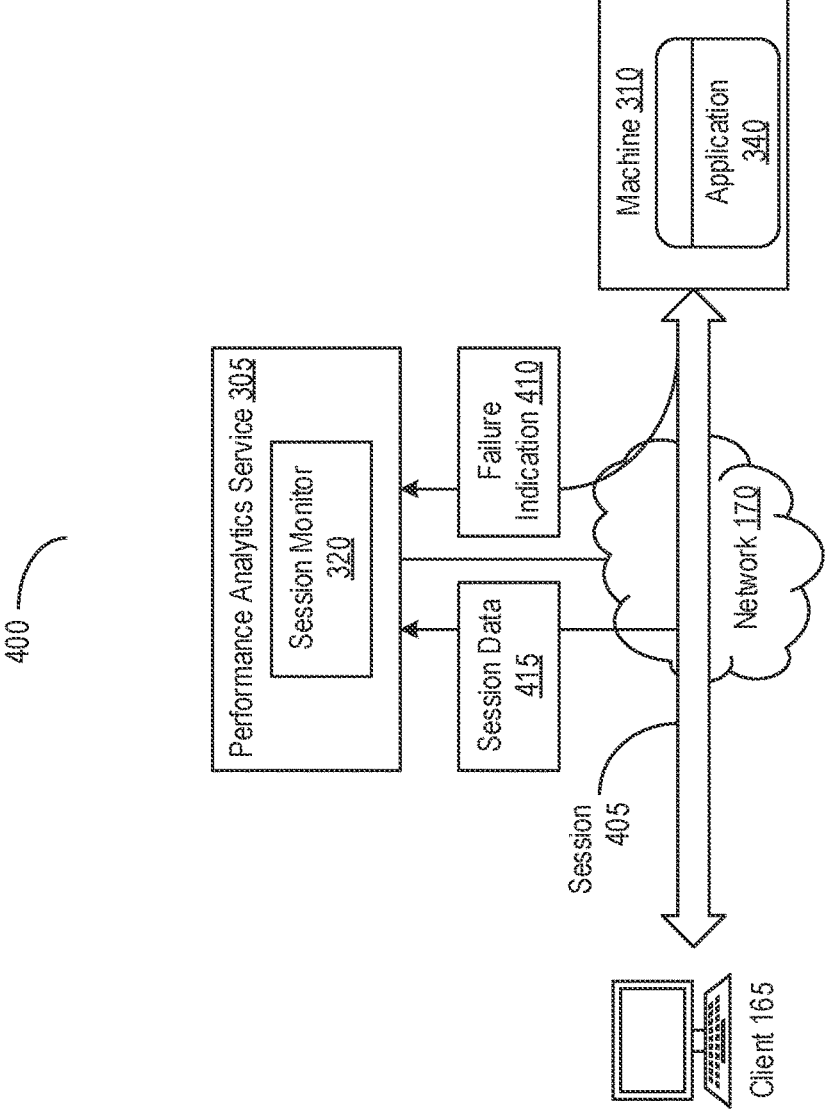
FIG. 4A is a block diagram of an embodiment of a process for monitoring sessions in the system for correlating session failures with application faults in accordance with an illustrative embodiment.

Referring now to FIG. 4A, depicted is a block diagram of a process 400 for monitoring sessions in the system 300 for correlating session failures with application faults. The process 400 may correspond to or include operations performed in the system 300 to monitor for session failures. For context, the client 165 may initiate and establish at least one session 405 with one of the machines 310 to access the application 340 over one or more networks 170. For example, the user of the client 165 may login to the machine 310 by entering authentication credentials via an agent on the agent 165. The session 405 may be established in accordance with any number of communication protocols, such as the Remote Desktop Protocol (RDP), the Independent Computing Architecture (ICA), or the Remote Frame Buffer (RFB) protocol, among others. The network 170 over which the session 405 is to be established may be, for example, a virtual private network (VPN) or an intranet managed by a network administrator (e.g., user of the administrative device 315). The session 405 may be provided by the machine 310 on to communicate data with the client 165. The session 405 may provide the client 165 access to the application 340 whose resources are hosted on the server at least in part. The application 340 on the machine 310 may be of a particular version.

When the session 405 is established, the machine 310 may provide the client 165 access to the application 340 on the machine 310 via at least one virtual desktop. The virtual desktop may be a part of a physical or virtual machine (e.g., the machine 310), and may be a graphical user interface (GUI) to facilitate accessing of the applications for the session 602. For example, the virtual desktop may be a desktop environment for an operating system on the virtual machine to be provided to the client 165 for the session 405. In some embodiments, the machine 310 may modify, configure, or otherwise set the virtual desktop to provide the client 165 access to the requested application. The provision of the virtual desktop may correspond to a completion of the establishment of the session 405 between the client 165 and the machine 310 over the network 170. Upon establishment, various data regarding the machine 310, the session 405, and the virtual desktop may be collected to assess the performance of the machine 310 and the application 340 thereon.

Under the process 400, the session monitor 320 executing on the performance analytics service 305 may monitor the session 405 for at least one failure indication 410. The failure indication 410 may include or correspond to any breakdown, malfunction, or seizure associated with the session 405. For example, the failure indication 410 may correspond to a failure to launch the session 405, an unexpected termination of the session 405 after launch, or other breakdown in performance of the session 405, among others. The failure indication 410 may include a session identifier corresponding to the session 405. In some embodiments, in performing the monitoring, the session monitor 320 may identify or detect the failure indication 410 from at least one notification from the user of the client 165. For instance, upon observing a failure to launch the session 405 or a breakdown of an established session 405, the user may indication with the agent on the client 165 to indicate the failure of the session 405. In response, the agent on the client 165 may provide or send the failure indication 410 to the session monitor 320. Upon receipt, the session monitor 320 may detect the failure indication 410 for the session 405.

In some embodiments, the session monitor 320 may identify or detect the failure indication 410 from at least one notification from the administrator device 315. The administrator device 315 may receive a report of a session failure or poor user experience with the session 405 provided by the user of client 165 through the network 170. In response to the report, the administrative device 315 may send or provide the failure indication 410 to the session monitor 320. The failure indication 410 may be automatically provided by the administrative device 315 or may be sent upon command by the user of the administrative device 315. For example, the report may be displayed or presented to the user (e.g., a network administrator) on a graphical user interface of a diagnostic application on the administrative device 315. Based on the report, the user may interact with the user interface to send the failure indication 410 to the session monitor 320.

In some embodiments, the session monitor 320 may identify or detect the failure indication 410 from the network 170. To perform the monitoring, the session monitor 320 may receive, identify, or otherwise intercept communications on the session 405 over the network 170. The session monitor 320 (or the performance analytics service 305) may reside on the communication path between the client 165 and the machine 310. From the communications, the session monitor 320 may identify packets or messages (or lack thereof) correlated with the failure indication 410. For example, when a session timeout message for the session 405 is intercepted over the network 170, the session monitor 320 may determine that the session 405 has failed and detect the failure indication 410 for the session 405. In addition, when a heartbeat message is not received in an expected time interval relative to a previously received heartbeat signal, the session monitor 320 may determine that the session 405 has failed from the lack of the heartbeat message. The session monitor 320 may also detect the failure indication 410 for the session 405.

In conjunction, the session monitor 320 may aggregate, collect, or otherwise identify session data 415 associated with the session 405 between the client 165 and the machine 310. The session data 415 may identify or include any number of network metrics for the session 405 (or the network 170 over which the session 405 is established), such as a round trip time (RTT), network delay, jitter, bandwidth usage, throughput, or latency, among others of the session 405. The session data 415 may be defined or gathered over one or more time periods (e.g., in accordance with a sampling rate). In some embodiments, the session data 415 may include other machine-related performance data of the client 165 or the physical machine 310, such as processor usage, memory usage, power consumption, and response time, among others. In addition, the session monitor 320 may gather the session data 415 for the client 165 or the machine 310 over multiple sessions 405. The session monitor 320 may aggregate the session data 415 for other clients 165 and machines 310 in different sessions 405. The session data 415 may be uniquely identified using a session identifier assigned by the session monitor 320 for the individual sessions 405. The session data 415 may be used to assess and evaluate the cause of the failure in the session 405 leading to the failure indication 410.

With the detection, the session monitor 320 may produce or generate an association of the user, the client 165, the machine 310, or the session 405 with the failure indication 410. The session monitor 325 may also store and maintain the association. The association may be arranged, organized, or maintained using one or more data structures on a database accessible from the performance analytics service 305. The data structures may include, for example, such as a linked list, tree, array, table, hash table, queue, stack, or heap, among others. For example, the association may be stored in a field-value pair in a table data structure, including an identifier for the user (e.g., an user identifier or account identifier), an identifier for the client 165 (e.g., a device identifier), an identifier for the machine 310 (e.g., a machine identifier), and an identifier for the session 405 (e.g., a session identifier), with a tag for the failure indication 410, among others. In some embodiments, the association may also be with the session data 415 identified for the session 405.

Figure 4B:
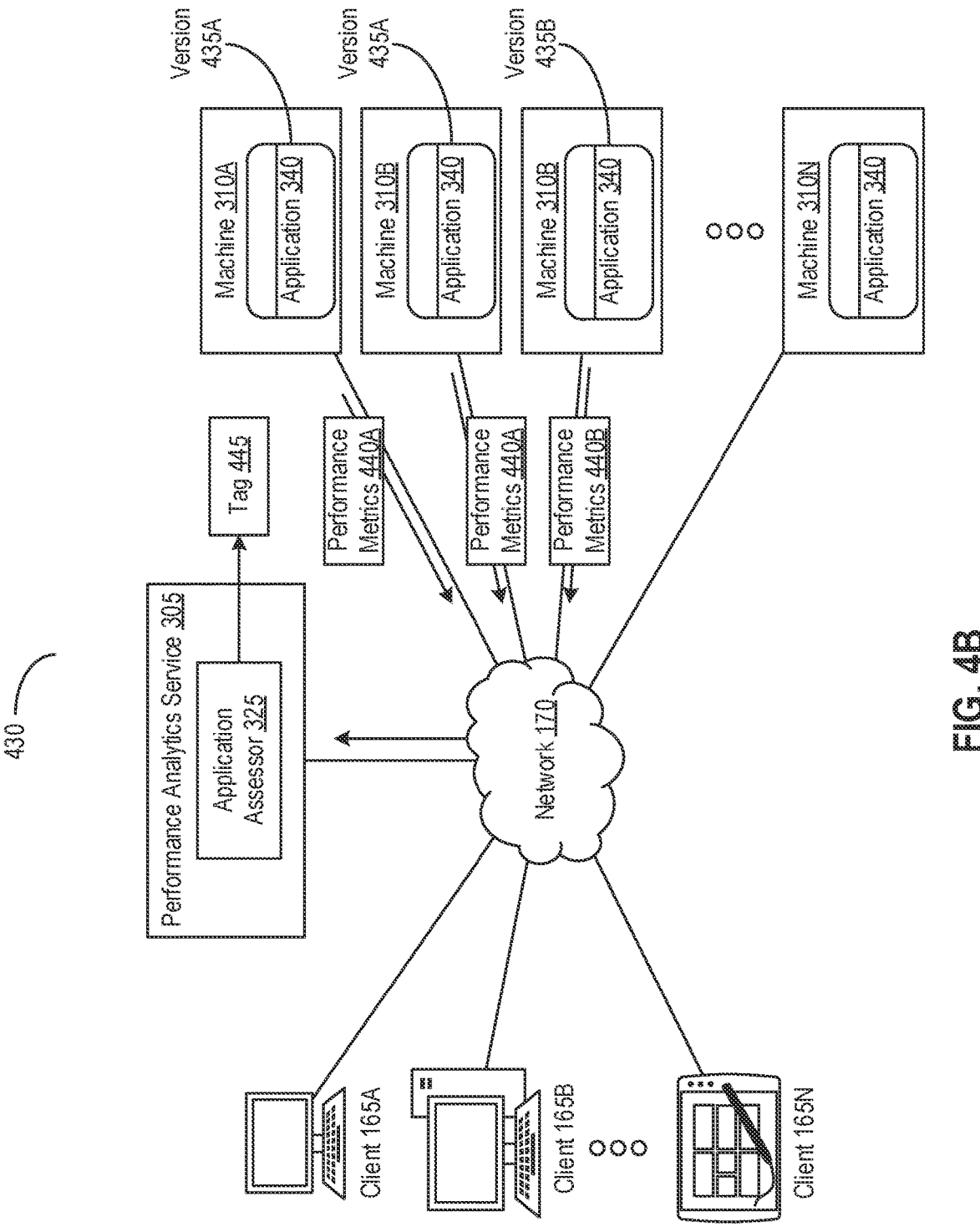
FIG. 4B is a block diagram of an embodiment of a process for aggregating performance metrics in the system for correlating session failures with application faults in accordance with an illustrative embodiment.

Referring now to FIG. 4B, depicted is a block diagram of a process 430 for aggregating performance metrics in the system 300 for correlating session failures with application faults. For context, the applications 430 running on the machines 310 across the network 170 may be of different versions 435A-N (hereinafter generally referred to as versions 435). Among the different versions 435, one version 435 may be an upgrade or update to a prior version 435 of the application 340. In the depicted example, the first machine 310A and the second machine 310B may each have an instance of the application 340 of the first version 435A. The third machine 310C may have an instance of the application 340 of the second version 435B. The first version 345A may be a more recent, updated version of the application 340, whereas the second version 345B may be a previous version of the application 340. The machines 310 of the network 170 may include a first group (e.g., the first machine 310A and the second machine 310B) running the first version 435A of the application 340 and a second group (e.g., the third machine 310C) running the second version 435B of the application 340. Groups with different versions 345 of the application 340 may be referred to as application deployment groups or application delivery groups.

Each version 435 may define one or more functions or features provided by the application 340. Between version 435, the application 340 may have additional, modified, or removed features or functions. Continuing with the above example, the first version 435A may be an updated or more recent iteration of the application 340, relative to the second version 435. Comparing the two versions 435, the first version 435A of the application 340 may have additional features unavailable in the second version 435B and similar and modified functions also provided by the second version 435B. Furthermore, the first version 435A of the application 340 may lack at least some of the features and functions provided by the second version 435B. For instance, the application 340 may be a spreadsheet processing program, and the first version 435A may have statistics analysis functions that are not found in the second version 435B.

Under process 430, the application assessor 325 executing on the performance analytics service 305 may retrieve, aggregate, or otherwise identify performance metrics 440A-N (hereinafter generally referred to as performance metrics 440) for one or more versions 435 of the application 340. In some embodiments, the application assessor 325 may identify the performance metrics 440 in response to detection the failure indication 410 in one or more of the sessions 405 in the network 170. In some embodiments, the application assessor 325 may receive and gather the performance metrics 440 at one or more time periods (e.g., in accordance with a sampling rate). The performance metrics 440 themselves may identify or include a time window or time stamp at which the performance metric 440 was measured, obtained, or identified. In some embodiments, the application assessor 325 may receive the performance metrics 440 upon request for application performance from the administrative device 315.

The performance metrics 440 may identify or include various measures related to the performance of instances of the application 340 of a given version 435. The performance metrics 440 for a given version 435 may identify or include, for example: a time of completion of function calls (e.g., events) in the application 340; a response time of application

340 to user interactions; a frequency of calls in the application 340; an success rate or an error rate for calls in the application 340; a number (or rate) of launch failures of the application 340; and a number (or rate) of crashes for the application 340; among others. In some embodiments, the performance metrics 440 may also identify or include various measures of the machine 310 associated in running the application 340 of a given version 435. The performance metrics 440 may also include metadata associated with the application 430, such as an application name referencing the application 430, a process identifier for the application 430, a version identifier referencing the version 435, a device identifier for the machine 310 on which the application 430 is on, a group identifier for a group to which the client 165 (or machine 310) belongs; a device identifier for the client 165 accessing the machine 310, or a user identifier for the user of the client 165 accessing the machine 310, among others.

To identify, the application assessor 325 may send, provide, or transmit a request for application performance for the application 340 on each respective machine 310. Each machine 310 may store and maintain the performance metrics 440 for the application 340 on the machine 310. In some embodiments, the gateway or the service on which the machine 310 is hosted may store and maintain the performance metrics 440 for the application 340. In some embodiments, the client 165 (e.g., the agent on the client 165) may store and maintain the performance metrics 440 for the application 340 accessed by the client 165. Upon receiving the request, the recipient machine 310 (or gateway, service, or client 165) may send, transmit, or otherwise provide the performance metrics 440 to the application assessor 325. The application assessor 325 may retrieve, receive, or otherwise identify the application metrics 440.

With receipt, the application assessor 325 may determine or identify the performance metrics 440 of the application 340 of one or more versions 435. The application assessor 325 may categorize, arrange, and otherwise group the performance metrics 440 by versions 435. The aggregated performance metrics 440 may include a first subset of the performance metrics 440A for the first version 435A of the application 340 and a second subset of the performance metrics 440B for the second version 435B of the application 340. The application assessor 325 may identify the version 435 with which the performance metrics 440 is associated based on the version identifier indicated in the metadata. In some embodiments, the application assessor 325 may identify which version 435 (e.g., the first version 435A) is an upgrade to the application 435 relative to a previous version 435 (e.g., the second version 435B) based on the version identifier of the metadata. For example, the version identifier for the first version 435A may be of a higher value or may indicate a more recent iteration of the application 340 than the version identifier for the second version 435B. Using the values of the version identifiers, the application assessor 325 may identify that the first version 435A is a more recent update than the second version 435B to the application 340.

In some embodiments, the application assessor 325 may identify the performance metrics 440A as associated with a first group of clients 165 (or machines 310) using the first version 435A of the application 340. The application assessor 325 may also identify the performance metrics 440B as associated with a second group of clients 165 (or machines 310) using the second version 435B of the application 340. The groups of clients 165 or machines 310 may be in a differing delivery groups receiving versions 435 of the application 340 at different times or may be in different environments. For example, the first group may be in a test environment for the first version 435A of the application 340, while the second group may be in a runtime, enterprise environment using the second version 435B of the application 340. The identification of performance metrics 440 as associated with a particular group of clients 165 (or machines 310) may be based on one or more identifiers included in the metadata, such as the individual device identifiers for the clients 165 or machines 310 or the group identifiers of the groups that the clients 165 or machines 310 belong to.

In some embodiments, the application assessor 325 may classify or identify the performance metrics 440 for the different versions 435 of the application 340 based on the time periods from which the performance metrics 440 is obtained. For one or more machines 310 in the network 170, the first version 435A of the application 340 may be used over a first time period and the second version 435B of the application 340 may have been used for a second time period preceding the first period. For each performance metrics 440 gathered for the instances of the applications 340, the application assessor 325 may identify the time window during which the respective performance metrics 440 was obtained. With the identification, the application assessor 325 may compare the time window during which the performance metrics 440 are obtained with the time period for the version 435. When the time window of the performance metrics 440 matches the time period for the first version 435A, the application assessor 325 may classify the corresponding performance metrics 440 as for the first version 435A of the application 340. Conversely, when the time window of the performance metrics 440 matches the time period for the second version 435B, the application assessor 325 may classify the corresponding performance metrics 440 as for the second version 435B of the application 340.

Using the performance metrics 440, the application assessor 325 may determine whether there is a degradation (or difference) in performance between the versions 435 of the application 340. The degradation may be indicative or correlated with the difference in versions 435 of the application 430. To determine, the application assessor 325 may compare the performance metrics 440 of one version 435 (e.g., the first version 435A) with the performance metrics 440 of the other version 435 (e.g., the second version 435B) of the application 340. In facilitating the comparison, the application assessor 325 may calculate, determine, or otherwise generate a score for each version 435 of the application 340 as a function (or combination) of the performance metrics 440 for the version 435. The function may be, for example, a weighted sum of the normalized values of time of completion of function calls (e.g., events), a response time to user interactions, an success rate or an error rate for calls, a number of launch failures, and a number of crashes for the application, among others. The score may be indicative of the overall performance of the version 435 of the application 340 or the quality of user experience of the user accessing the version 435 of the application 340. In general, the higher the score, the better the overall performance and the quality of user experience may be. Conversely, the lower the score, the worse the overall performance and the quality of the user experience may be.

With the determinations, the application assessor 325 may compare the score of one version 435 (e.g., the first version 435A) with the score of the version 435 (e.g., the second version 435B) of the application 340. From comparison, the application assessor 325 may calculate or determine a difference between the scores of the different versions 435 of the application 340. The difference may indicate a degree of dissimilarity in performance between the different versions 435. The application assessor 325 may compare the difference to a threshold. The threshold may identify or indicate a value for the difference at which one version 435 is determined to have undergone a degradation of performance. The threshold may also indicate the value for the difference at which the performance scores are deemed to be significantly different.

If the difference does not satisfy (e.g., less than) the threshold, the application assessor 325 may determine that there is no degradation (or difference) in the performance between the different versions 435 of the application 340. On the other hand, if the difference satisfies (e.g., the greater than or equal to) the threshold, the application assessor 325 may determine that there is degradation in performance between the versions 435 of the application 340. The application assessor 325 may also identify which version 435 has the degradation. When the score for the first version 345A is greater than the score for the second version 345B, the application assessor 325 may determine that the second version 345B has the lower performance. In contrast, when the score for the second version 345B is greater than the score for the first version 345A, the application assessor 325 may determine that the first version 345A has the lower performance.

The application assessor 325 may output, produce, or otherwise generate an association between the application 430 and the performance metrics 440. The application assessor 325 may also generate the association between each version 435 of the application 430 and the respective performance metrics 440. With the generation, the application assessor 325 may store and maintain the association. The association may be arranged, organized, or maintained using one or more data structures on a database accessible from the performance analytics service 305. The data structures may include, for example, such as a linked list, tree, array, table, hash table, queue, stack, or heap, among others. In addition, the application assessor 325 may also generate at least one tag 445 between the version 435 and an indication of the degradation in performance for the version 435 of the application 340. The tag 445 may also identify a time at which the degradation was identified. With the generation, the application assessor 325 may store and maintain the tag 445 using one or more data structures on the database. For instance, when the first version 435A is determined to have led to the degradation, the application assessor 325 may store the tag 445 between the first version 435A and the indication of degradation in performance.

Figure 4C:
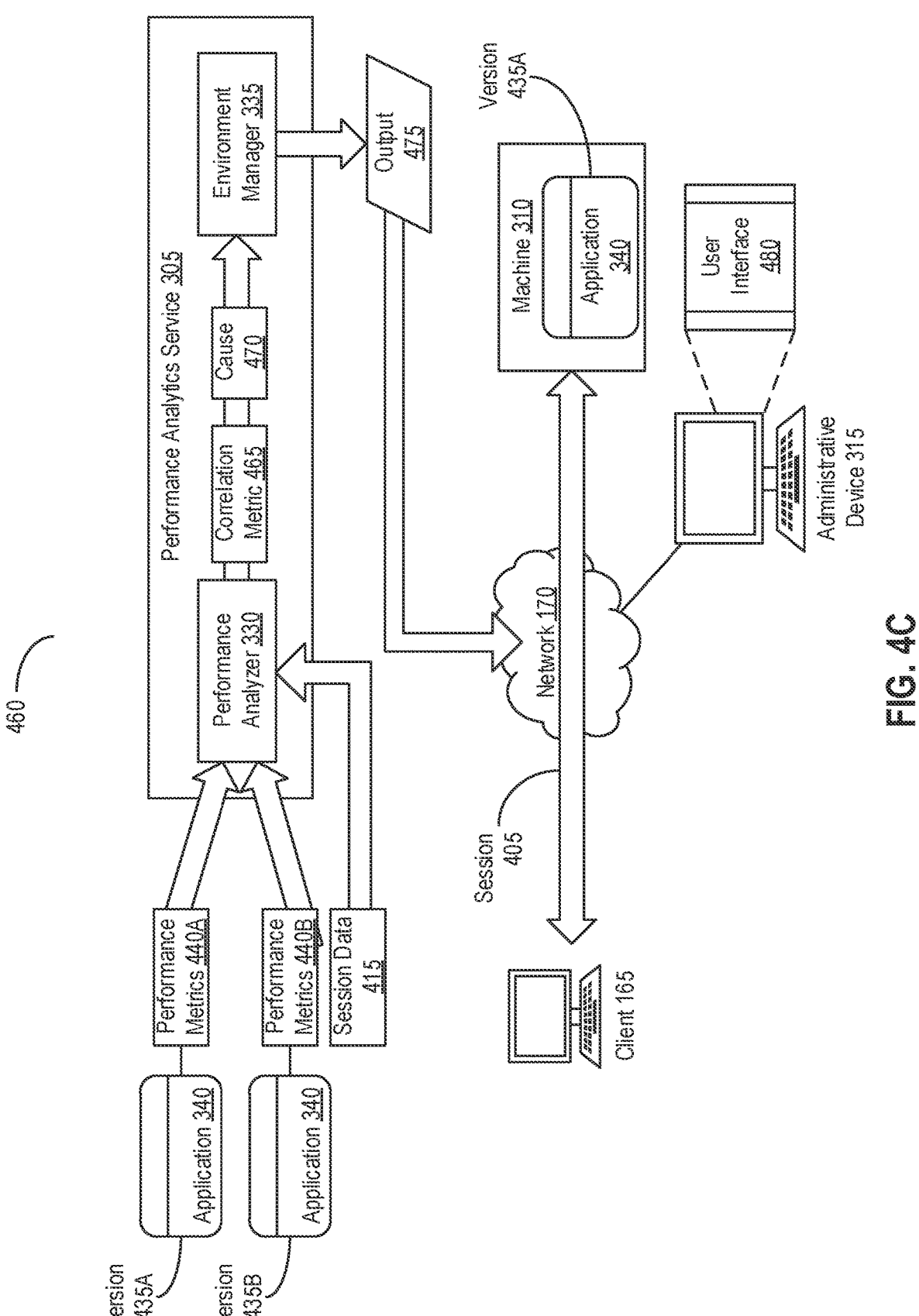
FIG. 4C is a block diagram of an embodiment of a process for evaluating applications in the system for correlating session failures with application faults in accordance with an illustrative embodiment.

Referring now to FIG. 4C, depicted is a block diagram of a process 460 for evaluating applications in the system 300 for correlating session failures with application faults. Under process 460, the performance analyzer 330 executing on the performance analytics service 305 may classify, identify, or otherwise determine whether an origin (or cause) of the failure indication 410 for the session 405 is unknown or otherwise uncategorized based on the session data 415. The origin (or cause) of the failure in the session 405 may be related to the session 405, the client 165, or the machine 310. For example, the failure may have been brought about due to: interruption of the network 170 over which the session 405 is established, cessation of the client 165, or halt to operations of the machine 310, among others. To determine the origin of the failure indication 410, the performance analyzer 330 may use the session data 415 and the machine-related performance data of the client 165 and the machine 310, among others.

When the session data 415 indicates an interruption in the session 405 or the network 170, the performance analyzer 330 may determine that the origin of the failure indication 410 is from the session 405 itself. For instance, the session data 415 may indicate a network-wide failure of the network 170 leading to the failure indication 410. When the machine-related indicates a degradation in performance of the client 165 (e.g., related to processor or memory usage), the performance analyzer 330 may determine the origin of the failure indication 410 is from the client 165 itself. When the machine-related indicates a degradation in performance of the machine 310 (e.g., related to processor or memory usage of the underlying physical hardware), the performance analyzer 330 may determine the origin of the failure indication 410 is from the machine 310 itself.

Otherwise, when the failure indication 410 is not attributable to the session 405, the client 165, or the machine 310, the performance analyzer 330 may determine that the origin of the failure indication 410 for the session 405 is unknown or uncategorized. By determining, the performance analyzer 330 may filter the failure indication 410 and the session data 415 from additional processing to the determine the cause of the failure in the session 405. If the origin of the failure indication 410 is determined to be unknown or otherwise uncategorized, the performance analyzer 330 may perform additional analysis using the performance metrics 440 to determine whether the cause is related to the application 340.

The performance analyzer 330 may calculate, generate, or otherwise determine at least one correlation metric 465 between the failure in the session 405 (e.g., as identified with the failure indication 410) and the upgrade of the application 340 to the version 435 (e.g., the first version 435A as depicted). In some embodiments, the performance analyzer 330 may initiate the determination of the correlation metric 465, when the origin of the failure of the session 405 is unknown or uncategorized. The determination of the correlation metric 465 may be based at least on the failure indication 410 and the performance metrics 440 for each version 435 of the application 340, such as the performance metrics 440A for the first version 435A and the performance metrics 440B for the second version 435B. In some embodiments, the determination of the correlation metric 465 may be also based on the session data 415 and the identification of the degradation in performance between the versions 435 of the application 340 (e.g., using the tag 445). To determine the correlation metric 465 for the application 340, the performance analyzer 330 may select or identify the performance metrics 440 corresponding to the application 340 using the metadata in the performance metrics 440 (e.g., the application name or process identifier). The performance analyzer 330 may also identify the session data 415 in which the application 340 was accessed using the session identifier associated with the failure indication 410.

The correlation metric 465 may be indicative of a statistical relationship or association among the failure indication 410 and the performance metrics 440 of each version 435 of the application 340. The correlation metric 465 may factor in the values of the data sources over time, and may also vary over time. In some embodiments, the performance analyzer 330 may use any number of functions to calculate the correlation metric 465, such as a Pearson product-moment coefficient, a Kendall tau rank correlation coefficient, Spearman correlation coefficient, and Point-Biserial correlation coefficient, among others. In general, the higher the correlation metric 465, the more likely that the upgrade of the application 340 from one version 435 (e.g., the second version 435B) to another version 435 (e.g., the first version 435A) lead to the failure indication 410 in the session 405. Conversely, the lower the correlation metric 465, the less likely that the upgrade of the application 340 lead to the failure indication 410 in the session 405.

Using the correlation metric 465, the performance analyzer 330 may identify or determine whether the upgrade of the application 340 (e.g., from the second version 435B to the first version 435A as depicted) is a cause 470 of the failure in the session 405 (e.g., associated with the failure indication 410). The cause 470 may identify whether the upgrade of the application 340 lead to the failure in the session 405. To determine, the performance analyzer 330 may compare the correlation metric 465 to a threshold. The threshold may define or identify a value for the correlation metric 465 at which to determine that the failure in the session 405 is caused by the upgrade to the application 340 or to perform additional analysis regarding the cause 470. If the correlation metric 465 does not satisfy (e.g., less than) the threshold, the performance analyzer 330 may determine that the cause 470 of the failure in the session 405 is not the upgrade to the application 340. On the other hand, if the correlation metric 465 satisfies (e.g., greater than or equal to) the threshold, the performance analyzer 330 may determine that the cause 470 of the failure in the session 405 is the upgrade to the application 340.

In some embodiments, when the correlation metric 465 satisfies the threshold, the performance analyzer 330 may carry out additional analysis (e.g., root cause analysis (RCA)) to process the performance metrics 440 of the application 340 and the failure indication 410 for the session 405, along with other data. For example, the performance analyzer 330 may identify a time at which the degradation in the performance of the application 340 from one version 435 (e.g., the second version 435B) to another version 435 (e.g., the first version 435A) using the tag 445. The performance analyzer 330 may also identify a time at which performance of sessions 405 degraded from the session data 415. With the identifications, the performance analyzer 330 may compare the two times. If the time of the degradation in performance of the version 435 of the application 340 precedes the time of degradation in sessions 405, the performance analyzer 330 may determine the upgrade to the application 340 as the cause 470 of the failure. Otherwise, if the time of the degradation in performance of the version 435 of the application 340 is subsequent to the time of degradation in sessions 405, the performance analyzer 330 may determine the upgrade to the application 340 as not the cause 470 of the failure. In some embodiments, the performance analyzer 330 may determine the upgrade to the application 340 as the cause 470 of the failure in the session 405, when the tag 445 indicating the degradation between the versions 435 is present.

With the determination of the cause 470, the performance analyzer 330 may produce, output, or otherwise generate an association between the version 435 of the application 340 and the determination of whether the upgrade is the cause 470 of the failure in the session 405. The version 435 may correspond to the one to which the application 340 is upgraded or updated to (e.g., upgraded to the first version 435A from the second version 435B). When the cause 470 of the failure is determined to be the upgrade to the application 340, the association may be between the version 435 and the determination that the upgrade is the cause 470 of the failure in the session 405. Conversely, when the cause 470 of the failure is determined to be not the upgrade to the application 340, the association may be between the version

435 and the determination that the upgrade is not the cause 470 of the failure in the session 405. Upon generation, the performance analyzer 330 may store and maintain the association. The association may be arranged, organized, or maintained using one or more data structures on a database accessible from the performance analytics service 305. The data structures may include, for example, such as a linked list, tree, array, table, hash table, queue, stack, or heap, among others.

The environment manager 335 executing on the performance analytics service 305 may produce, generate, or otherwise provide at least one output 475 based on the determination of the cause 470. In some embodiments, the environment manager 335 may generate the output 475 to identify or include an indication of the cause 470 of the failure of the session 405. When the cause 470 of the failure of the session 405 is determined to be the upgrade, the indication of the output 475 may identify the upgrade to the application 340 as the cause 470 of the failure of the session 405. In some embodiments, the output 475 may identify the version 435 (e.g., the first version 435A) of the application 340 leading to the determination of the cause 470 of the failure. On the other hand, when the cause 470 of the failure of the session 405 is determined to be not the upgrade, the indication of the output 475 may identify the upgrade to the application 340 as not the cause 470 of the failure of the session 405. In some embodiments, the indication of the output 475 may identify the cause 470 as unknown.

With the generation of the indication for the output 475, the environment manager 335 may send, transmit, or otherwise provide the output 475 to the administrative device 315. Upon receipt of the output 475, the administrative device 315 may present or display the indication of the output 475 via at least one user interface 480. The user interface 480 may be, for example, a graphical user interface (GUI) of an application for managing machines 310 running on the administrative device 315. In some embodiments, the environment manager 335 may send, transmit, or otherwise provide the output 475 including the indication to the machine 310 on which the application 340 with the version 435 identified as the cause 470. Upon receipt, the machine 310 may display or present the indication of the output 475 via a user interface. The user interface may belong to the virtual desktop in which the application 340 is running or may be of the application 340 itself. In some embodiments, the environment manager 335 may send, transmit, or otherwise provide the output 475 including the indication to the client 165 accessing the machine 310 hosting the application 340 with the version. Upon receipt, the agent running on the client 165 may display or present the indication of the output 475 via a user interface. The user interface may belong to the agent executing on the client 165 for accessing the machine 310.

In some embodiments, the environment manager 335 may generate the output 475 to include or identify instructions to counteract, resolve, or otherwise handle the degradation in performance of the application 340, when the cause 470 of the failure in the session 405 is determined to be the upgrade. In some embodiments, the environment manager 335 may identify or select instructions to handle the degradation from a database accessible from the performance analytics service 305. The instructions may be defined or specified in at least one script customized or configured by an administrator (e.g., using the administrative device 315) of the network 170 or the machines 310. The instructions may, for example, may deactivate at least some of the functionality of the application 340, disable running on the application 340 in the machine 310, presentation of a prompt warning the user regarding the degradation when launching the application 340 via the agent on the client 165, or place the application 340 in safe mode, among others. The environment manager 335 may access the database to fetch or retrieve the script with the instructions from the administrator. Upon retrieval, the environment manager 335 may insert or include the instructions to the output 475.

In some embodiments, the environment manager 335 may generate the instructions for the output 475 may define or specify restoration or rolling back to another version 435 (e.g., the second version 435B) of the application 340. The instructions may specify that the machine 310 roll back the instance of the application 340 with the version 435 (e.g., the first version 435A) leading to the cause 470 of the failure in the session 405 to the other version 435 (e.g., the second version 435B). In generating the instructions, the environment manager 335 may identify or select the version 435 (e.g., the second version 435B) of the application 340 to which to roll back. The selection may be based on the performance metrics 440 of the versions 435 of the application 340, among others. Based on the performance metrics 440, the environment manager 335 may determine whether a corresponding version 435 of the application 340 is stable. When the version 435 is determined to be not stable, the environment manager 335 may exclude the version 435 from selection for rolling back the application 340. When the version 435 is determined to be stable, the environment manager 335 may select the version 435 as the one to which the application 340 is to be rolled back. The environment manager 335 may generate the instructions to roll back instances of the application 340 to the selected version 435. Upon generation, the environment manager 335 may further insert or include the instructions into the output 475.

With the generation, the environment manager 335 may send, transmit, or otherwise provide the output including the instructions to the machine 310 with the version 435 of the application 340. In some embodiments, the environment manager 335 may select or identify machines 310 with the version 435 of the application 340 corresponding to the cause 470 of the failure in the session 405 or the degradation of performance of the application 340. With the identification, the environment manager 335 may provide the output 475 to each machine 310. Upon receipt, the machine 310 may parse the output 475 to extract or identify the instructions. The recipient machine 310 may carry out, perform, or execute the instructions. For instance, when the instructions specify rolling back, the machine 310 may roll back the instance of the application 340 hosted thereon to the selected version 435 (e.g., from the first version 435A to the second version 435B). When accessed by the client 165, the machine 310 may then provide the rolled back version 435 of the application 340 for the user of the client 165.

In some embodiments, the environment manager 335 may generate the output 475 to include analytics information. The analytics information may identify or include various data regarding the performance of the sessions 405, the machines 310, or the applications 340, among others, of the network 170. The environment manager 335 may generate the analytics information, for example, using the performance metrics 440 (e.g., the performance metrics 440A of the first version 435A and the performance metrics 440B of the second version 435B), the association between the version 435 and the determination of the cause 470, and the session data 415, among others. In generating the analytics information, the environment manager 335 may identify users or clients 165 affected by the upgrade from one version 435 (e.g., the second version 435B) to another version 435 (e.g., the first version 435A) of the application 340. To identify, the environment manager 335 may identify clients 165 accessing machines 310 with the version 435 of the application 340 leading to the cause 470 of the failure in the session 405. With the identification, the environment manager 335 may find the users that have used the corresponding clients 165 or delivery groups of machines 310. For example, the environment manager 335 may identify user identifiers of users from the session data 415 or the performance metrics 440. Using these and other data, the environment manager 335 may generate the analytics information (e.g., in the form of a file). The environment manager 335 may include or insert the analytics information into the output 475.

With the generation, the environment manager 335 may transmit, send, or otherwise provide the output 475 including the analytics information to the administrative device 315 for presentation via the user interface 480. As discussed above, the user interface 480 may be, for example, a graphical user interface (GUI) of an application for managing machines 310 running on the administrative device 315. Upon receipt, the administrative device 315 may display or provide the analytics information via the user interface 480. Using the user interface 480, the user (e.g., the network administrator of the network 170) of the administrative device 315 may navigate various portions of the analytics information. Examples of the user interface 480 displaying the analytics information may be found on FIGS. 7A-C.

In this manner, the performance analytics service 305 may leverage performance metrics 440 and session data 415, among others, determine whether the cause 470 of a failure in the session 405 is attributable to upgrades to the application 340 from one version 435 (e.g., the second version 435B) to another version 435 (e.g., the first version 435A). With the determination of the cause 470, the performance analytics service 305 may be able to automatically and more effectively issue instructions to combat or resolve the faults with applications 340. The provision of such instructions may improve overall performance of machines 310 and the utility of the applications 340 for the users of clients 165 accessing the machines 310. In addition, the performance analytics service 305 may provide analytics information regarding the session failures and application faults to network administrators (e.g., at the administrative device 315). By providing this information, the administrator may be more able to better troubleshoot and assess the sessions 405, machines 310, applications 340, and upgrades. The administrator may also take countermeasures with higher confidence at addressing the degradation in performance.

Figure 5:
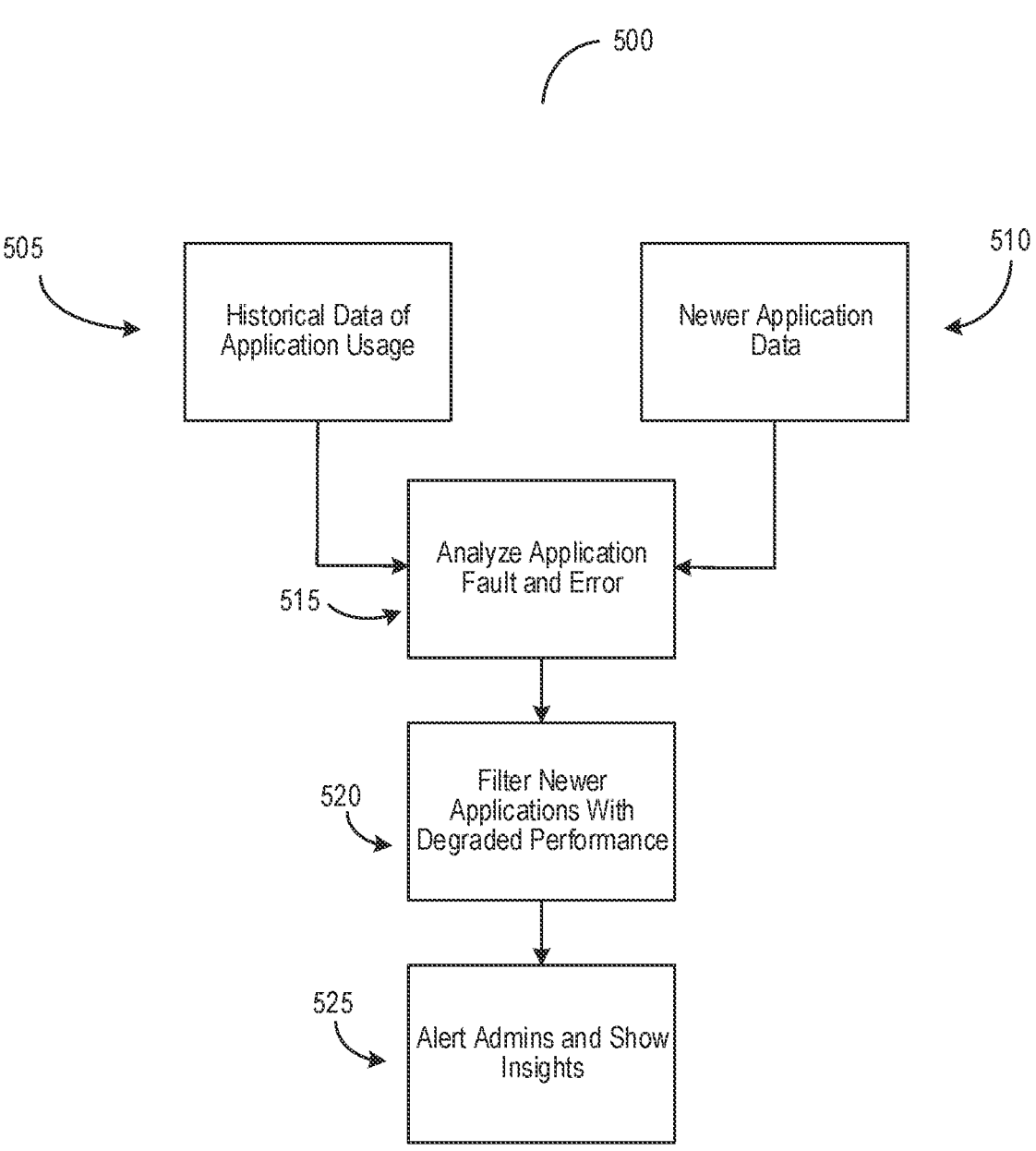
FIG. 5 is a flow diagram of an embodiment of a method of aggregating performance metrics in accordance with an illustrative embodiment.

Referring now to FIG. 5, depicted is a flow diagram of a method 500 of aggregating performance metrics. The operations and functionalities of the method 500 may be performed by the components described in FIGS. 1-4C, such as the performance analytics service 305. Under method 500, a service (e.g., the performance analytics service 305) may collect historical, application usage data for an older version (505). The service may also gather application usage data for a newer version (510). The service may analyze the application usage data for fault and errors (515). The service may filter newer versions of applications with degraded performance (520). The service may alert a network administrator and show insights for any degradations (525).

Figure 6:
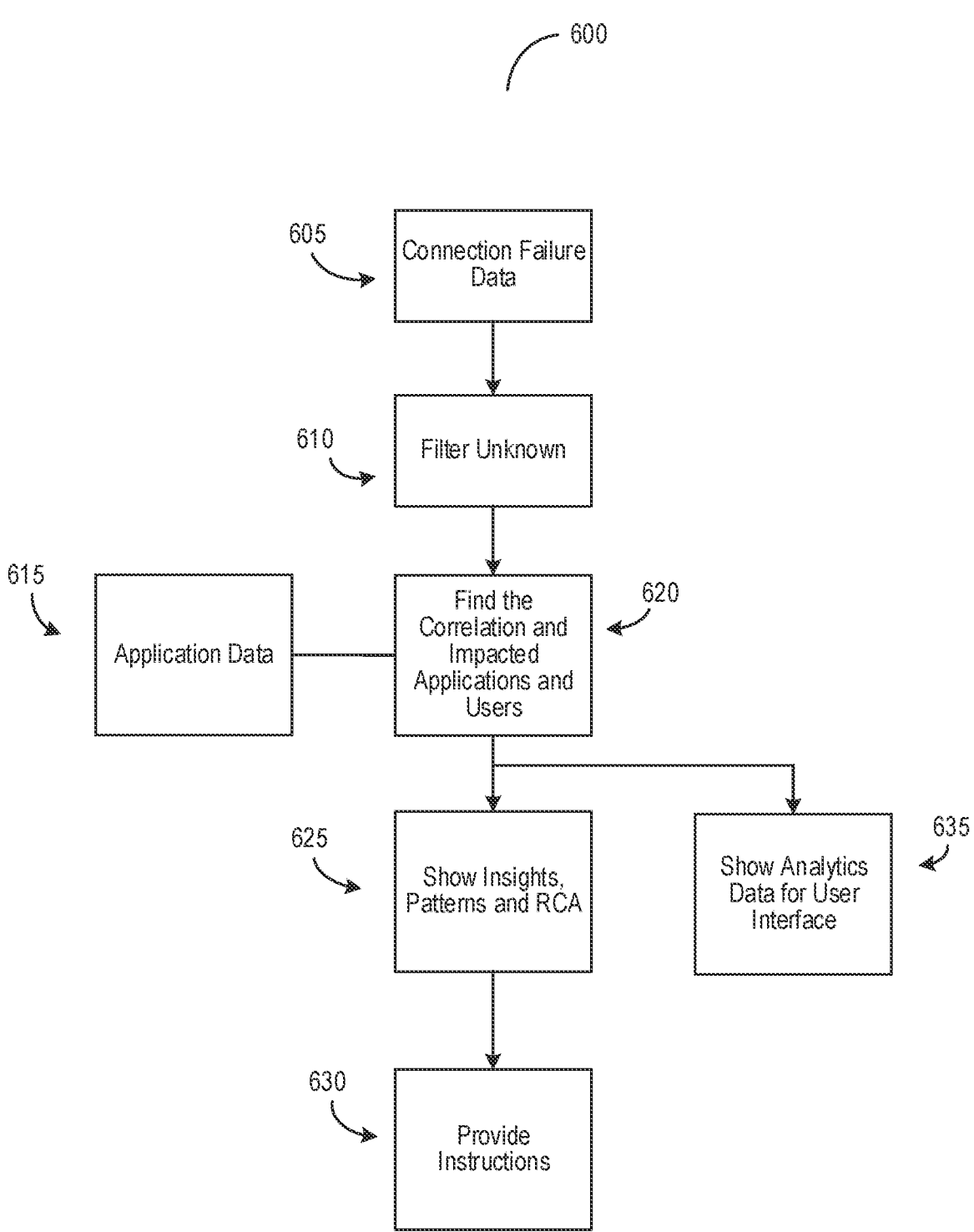
FIG. 6 is a flow diagram of an embodiment of a method of correlating application performance metrics with session failures in accordance with an illustrative embodiment.

Referring now to FIG. 6, depicted is a flow diagram of a method 600 of correlating application performance metrics with session failures. The operations and functionalities of the method 600 may be performed by the components described in FIGS. 1-4C, such as the performance analytics service 305. Under method 600, a service (e.g., the performance analytics service 305) may identify connection data failure (605). The service may filter for connection failures with indeterminate causes (610). The service may collect application usage data (615). The service may determine correlations between the connection data failure and the application faults, and may identify impacted applications and users (620). Using the determination, the service may show insights patterns and perform root cause analysis (RCA) (625). The service may provide instructions to address the application faults (630). The service may show analytics data for a user interface (635).

Figure 7A:
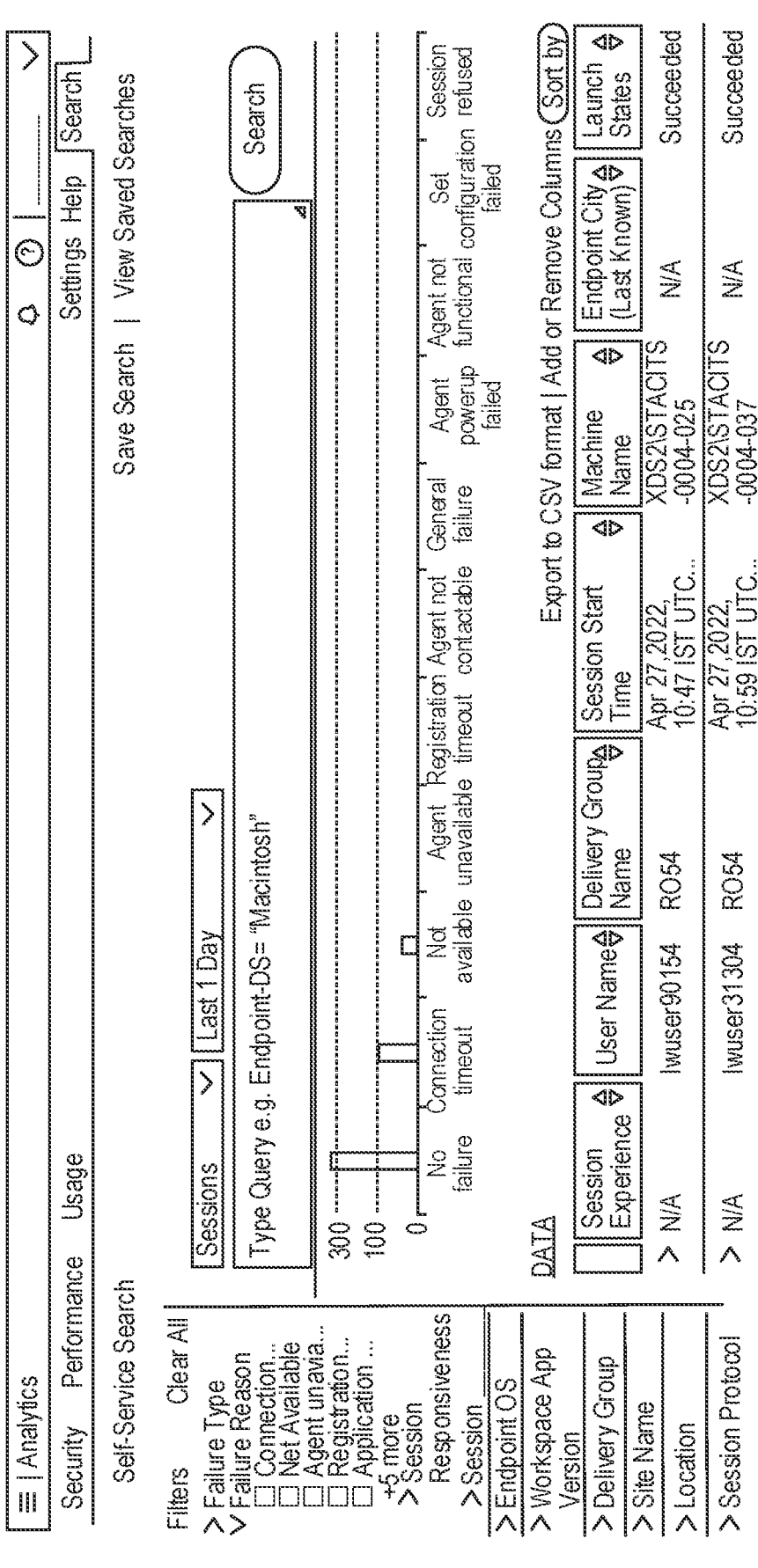
Figure 7C:
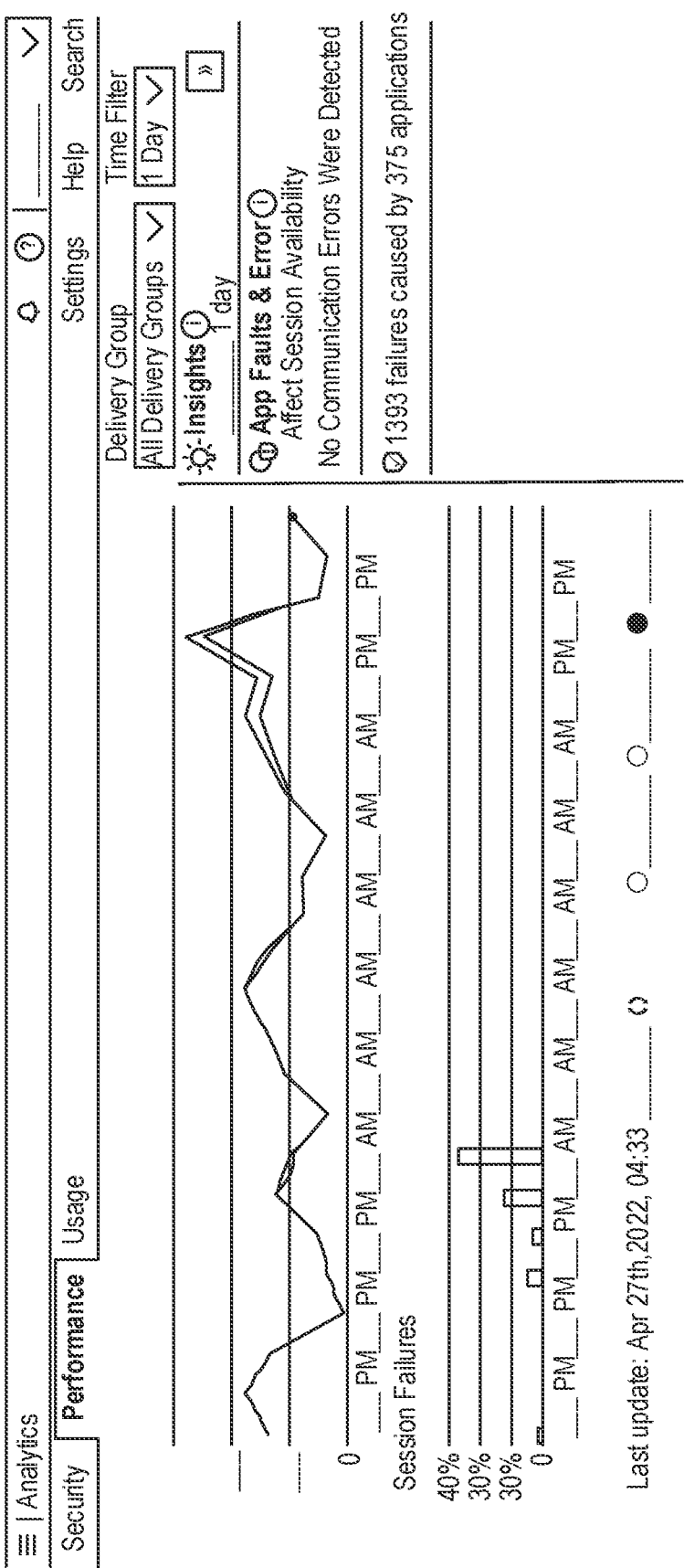

Referring now to FIGS. 7A-C, depicted are screenshots of user interfaces 700-710 presenting analytics information in the system for correlating session failures with application faults. Starting with FIG. 7A, the user interface 700 may include analytics information, such as number of sessions with no failures, connection time outs, not available, agent unavailable, registration timeout, agent not contactable, agent power up failure, agent not functional, configuration failure, session refusal, and application fault, among others. The analytics information may also include users by delivery groups, machine names, and an indication of successful or failure at session launch. Moving onto FIG. 7B, the analytics information in the user interface 705 may include a set of reasons for failure, with the number of instances attributable to corresponding causes, such as connection timeout, unavailability, agent unavailable, registration timeout, general failure, agent power up failure, agent not functional, configuration failure, session refusal, and application fault, among others. In FIG. 7C, the analytics information in the user interface 710 may include performance (e.g., generated using the session data 415 and performance metrics 440) over sampled time periods. The analytics information in the user interface 170 may include number of failures caused by applications generally on the right.

Figure 8:
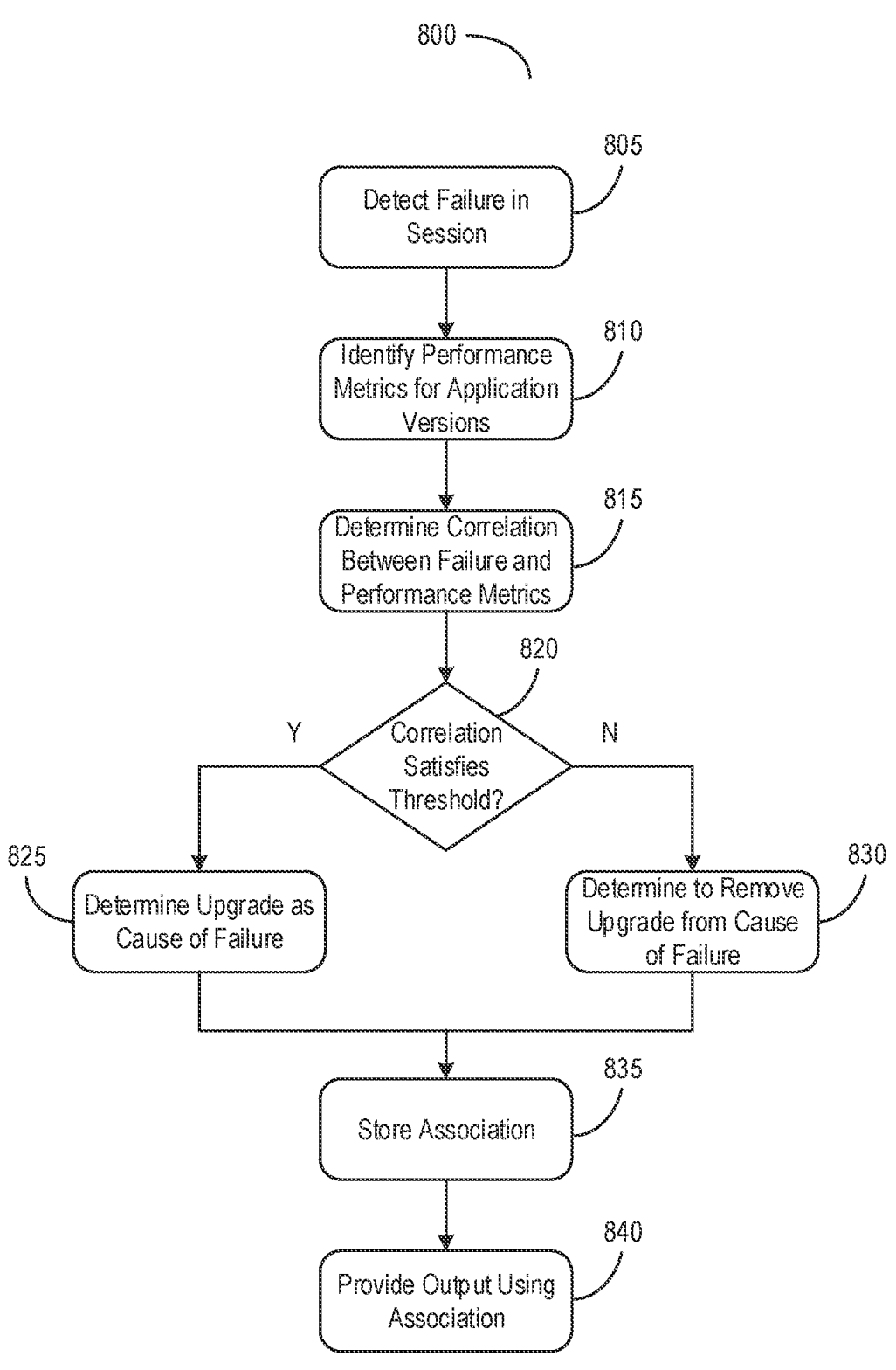
FIG. 8 is a flow diagram of an embodiment of a method of correlating session failures with application faults from upgrades in accordance with an illustrative embodiment.

Referring now to FIG. 8, depicted is a flow diagram of a method 800 of correlating session failures with application faults from upgrades. The operations and functionalities of the method 800 may be performed by the components described in FIGS. 1-4C, such as the performance analytics service 305. Under method 800, a service (e.g., the performance analytics service 305) may detect a failure (e.g., the failure indication 410) in a session (e.g., the session 405) (805). The service may identify performance metrics (e.g., the performance metrics 440) for versions (e.g., the version 435) of an application (e.g., the application 340) (810). The service may determine a correlation between the session failure and the performance metrics (815). The service may determine whether the correlation satisfies a threshold (830). If the correlation satisfies the threshold, the service may determine that an upgrade to the application is a cause (e.g., the cause determination 470) of the failure (825). On the other hand, if the correlation does not satisfy the threshold, the service may determine to eliminate the upgrade as the cause of the failure (830). The service may store an association between the cause of the failure with an upgraded version of the application (835). The application may provide an output using the association (840).

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C #, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method of determining an upgrade to an application as a cause of a failure in a session, comprising:
 detecting, by a device, a failure in a session via which a client is accessing a first version of an application;
 identifying, by the device in response to detecting the failure, first performance metrics for the first version of the application and second performance metrics for a second version of the application;
 determining, by the device based at least on the failure, the first performance metrics, and the second performance metrics, that an upgrade to the application to the first version from the second version is a cause of the failure in the session;
 storing, by the device, an association between the first version of the application and a determination that the upgrade is the cause of the failure in the session;

determining, by the device, for a second failure in a second session via which a second client is accessing a third version of the application, that a second upgrade to the application to the third version is not a cause of the second failure in the second session based at least on the second failure, the second performance metrics, third performance metrics for the third version; and
 storing, by the device, a second association between the third version of the application and a determination that the second upgrade is the second cause of the second failure in the second session.

2. The method of claim 1, further comprising providing, by the device, to a machine on which the application is hosted, instructions to handle a degradation in the first version of the application, responsive to determining that the upgrade is the cause of the failure.

3. The method of claim 1, further comprising selecting, by the device, from a plurality of versions of the application, the second version responsive to a determination that the second version is stable based at least on the second performance metrics.

4. The method of claim 1, further comprising providing, by the device, to an administrator, an indication that the upgrade to the application is the cause of the failure in the session.

5. The method of claim 1, further comprising providing, by the device, to an administrator for presentation on a user interface, analytics information based at least on the first performance metrics, the second performance metrics, and the association.

6. The method of claim 1, further comprising identifying, by the device, a plurality of users affected by the upgrade to the application based at least access by each of a plurality of clients of the first version of the application.

7. The method of claim 1, wherein identifying further comprises identifying (i) the first performance metrics from a first group of clients using the first version of the application and (ii) the second performance metrics from a second group of clients using the second version of the application.

8. The method of claim 1, wherein identifying further comprises identifying (i) the first performance metrics for a plurality of clients over a first time period during which the first version is used and (ii) the second performance metrics for at least one of the plurality of clients over a second time period during which the second version is used.

9. The method of claim 1, wherein determining further comprises determining a correlation between the upgrade to the application with the failure in the session as a function of the first performance metrics, the second performance metrics, and session data of a plurality of clients accessing the application.

10. A system for determining an upgrade to an application as a cause of a failure in a session, comprising:
 a device having one or more processors coupled with memory, configured to:
 detect a failure in a session via which a client is accessing a first version of an application;
 identify, in response to detecting the failure, first performance metrics for the first version of the application and second performance metrics for a second version of the application;
 determine, based at least on the failure, the first performance metrics, and the second performance metrics, that an upgrade to the application to the first version from the second version is a cause of the failure in the session; and store an association between the first version of the application and a determination that the upgrade is the cause of the failure in the session;

determine, for a second failure in a second session via which a second client is accessing a third version of the application, that a second upgrade to the application to the third version is not a cause of the second failure in the second session based at least on the second failure, the second performance metrics, third performance metrics for the third version; and store a second association between the third version of the application and a determination that the second upgrade is the second cause of the second failure in the second session.

11. The system of claim 10, wherein the device is further configured to provide, to a machine on which the application is hosted, instructions to handle a degradation in the first version of the application, responsive to determining that the upgrade is the cause of the failure.

12. The system of claim 10, wherein the device is further configured to provide, to an administrator, an indication that the upgrade to the application is the cause of the failure in the session.

13. The system of claim 10, wherein the device is further configured to provide, to an administrator for presentation on a user interface, analytics information based at least on the first performance metrics, the second performance metrics, and the association.

14. The system of claim 10, wherein the device is further configured to identify (i) the first performance metrics from a first group of clients using the first version of the application and (ii) the second performance metrics from a second group of clients using the second version of the application.

15. The system of claim 10, wherein the device is further configured to identify (i) the first performance metrics for a plurality of clients over a first time period during which the first version is used and (ii) the second performance metrics for at least one of the plurality of clients over a second time period during which the second version is used.

16. A non-transitory computer readable medium storing program instructions for causing one or more processors to:

detect a failure in a session via which a client is accessing a first version of an application;

identify, in response to detecting the failure, first performance metrics for the first version of the application and second performance metrics for a second version of the application;

determine, based at least on the failure, the first performance metrics, and the second performance metrics, that an upgrade to the application to the first version from the second version is a cause of the failure in the session;

store an association between the first version of the application and a determination that the upgrade is the cause of the failure in the session;

determine, for a second failure in a second session via which a second client is accessing a third version of the application, that a second upgrade to the application to the third version is not a cause of the second failure in the second session based at least on the second failure, the second performance metrics, third performance metrics for the third version; and store a second association between the third version of the application and a determination that the second upgrade is the second cause of the second failure in the second session.

17. The non-transitory computer readable medium of claim 16, wherein the instructions further cause the one or more processors to provide, to a machine on which the application is hosted, instructions to handle a degradation in the first version of the application, responsive to determining that the upgrade is the cause of the failure.

18. The non-transitory computer readable medium of claim 16, wherein the instructions further cause the one or more processors to provide, to an administrator, an indication that the upgrade to the application is the cause of the failure in the session.

* * * * *